US010891539B1

(12) United States Patent
Kearney et al.

(10) Patent No.: US 10,891,539 B1
(45) Date of Patent: Jan. 12, 2021

(54) EVALUATING CONTENT ON SOCIAL MEDIA NETWORKS

(71) Applicant: STA Group, Inc., Beverly Hills, CA (US)

(72) Inventors: Vasant Kearney, San Francisco, CA (US); Samuel Haaf, San Francisco, CA (US); John Dorsey, Los Angeles, CA (US); Aaron Schoenberger, Los Angeles, CA (US)

(73) Assignee: STA Group, Inc., Beverly Hills, CA (US)

(*) Notice: Subject to any disclaimer, the term of this patent is extended or adjusted under 35 U.S.C. 154(b) by 0 days.

(21) Appl. No.: 16/175,695

(22) Filed: Oct. 30, 2018

Related U.S. Application Data

(60) Provisional application No. 62/579,432, filed on Oct. 31, 2017.

(51) Int. Cl.
  *G06N 3/04* (2006.01)
  *G06K 9/62* (2006.01)
  *G06N 3/08* (2006.01)

(52) U.S. Cl.
  CPC ......... *G06N 3/0445* (2013.01); *G06K 9/6262* (2013.01); *G06N 3/08* (2013.01)

(58) Field of Classification Search
  CPC ....... G06N 3/0445; G06N 3/08; G06K 9/6262
  See application file for complete search history.

(56) References Cited

U.S. PATENT DOCUMENTS

| | | | |
|---|---|---|---|
| 9,177,060 B1 | 11/2015 | Bennett et al. | |
| 9,355,091 B2 | 5/2016 | Herdagdelen et al. | |
| 9,483,544 B2 | 11/2016 | Firat et al. | |
| 10,673,803 B2 | 6/2020 | Firat et al. | |
| 2009/0276705 A1* | 11/2009 | Ozdemir | G06K 9/00335 715/708 |
| 2014/0156231 A1* | 6/2014 | Guo | G06F 17/18 703/2 |

(Continued)

OTHER PUBLICATIONS

Jin et al. SocialSpamGuard: A Data MiningBased Spam Detection System for Social Media Networks. The 37th International Conference on Very Large Data Bases, Aug. 29 Sep. 3, 2011, Seattle, Washington. (Year: 2011).*

(Continued)

*Primary Examiner* — Alexey Shmatov
*Assistant Examiner* — Robert Bejcek, II
(74) *Attorney, Agent, or Firm* — Raubvogel Law Office

(57) ABSTRACT

A system and method may be used to evaluate content on one or more social media networks. A deep learning model may be stored. A communication may be received, that has been or is to be communicated on a social network. The deep learning model may be applied to the communication to obtain an automated evaluation of the communication. User input may be received, and may include a user evaluation of the communication. The user evaluation may be applied to train the deep learning model. The steps of receiving the communication, applying the deep learning model to obtain the automated evaluation, receiving the user evaluation, and applying the user evaluation to train the model, may be iterated to enhance the accuracy of the automated evaluations.

31 Claims, 18 Drawing Sheets

(56) References Cited

U.S. PATENT DOCUMENTS

| | | | |
|---|---|---|---|
| 2014/0164476 A1* | 6/2014 | Thomson | G06Q 10/101 709/203 |
| 2016/0070748 A1 | 3/2016 | Firat et al. | |
| 2016/0189171 A1 | 6/2016 | Bingham et al. | |

OTHER PUBLICATIONS

Chen et al. UTCNN: a Deep Learning Model of Stance Classification on Social Media Text. 2016. (Year: 2016).*

Naaman, Mor. Geographic Information from Georeferenced Social Media Data. SIGSPATIAL Special vol. 3 Issue 2, Jul. 2011 pp. 54-61. (Year: 2011).*

Godse et al. An Approach for Selecting Software-as-a-Service (SaaS) Product. 2009 IEEE International Conference on Cloud Computing. (Year: 2009).*

Zeng et al. Relation Classification via Convolutional Deep Neural Network. Proceedings of COLING 2014, the 25th International Conference on Computational Linguistics: Technical Papers, pp. 2335-2344, Dublin, Ireland, Aug. 23-29, 2014. (Year: 2014).*

Zhou, C., et al., "A C-LSTM Neural Network for Text Classification", Nov. 30, 2015, pp. 1-10.

Nguyen, D., et al., "Applications of Online Deep Learning for Crisis Response Using Social Media Information", Oct. 5, 2016, pp. 1-6.

Iandola, F., et al., "Densenet: Implementing Efficient ConvNet Descriptor Pyramids", Apr. 7, 2014, pp. 1-11.

Frome, A., et al., "Devise: A Deep Visual-Semantic Embedding Model", Advances in Neural Information Processing Systems, 2013, pp. 1-9.

Mikolov, T., et al., "Distributed Representations of Words and Phrases and their Compositionality", Advances in Neural Information Processing Systems, 2013, pp. 1-9.

Mikolov, T., et al., "Efficient Estimation of Word Representations in Vector Space", Sep. 7, 2013, pp. 1-12.

Yogatama, D., et al., "Generative and Discriminative Text Classification with Recurrent Neural Networks", May 26, 2017, pp. 1-9.

Pennington, J., et al., "Glove: Global Vectors for Word Representation", Proceedings of the 2014 Conference on Empirical Methods in Natural Language Processing (EMNLP), Oct. 25-29, 2014, pp. 1532-1543.

Zahavy, T., et al., "Is a Picture Worth a Thousand Words? A Deep Multi-Modal Fusion Architecture for Product Classification in E-Commerce", Nov. 29, 2016, pp. 1-10.

Kiros, R., et al., "Multimodal Neural Language Models", Proceedings of the 31st International Conference on Machine Learning (ICML-14), 2014, pp. 1-9.

Louis, A., et al., "Natural Language Processing for Social Media", Association for Computational Linguistics, 2017, vol. 42, No. 4, pp. 833-836.

Kannan, A., et al., "Smart reply: Automated Response Suggestion for Email", 2016, pp. 955-964.

Goldberg, Y., et al., "word2vec Explained: Deriving Mikolov et al.'s Negative-Sampling Word-Embedding Method", Feb. 14, 2014, pp. 1-5.

Eskesen, S., "Improving Product Categorization by Combining Image and Title", Jul. 5, 2017, pp. 1-43.

Nakov, P., et al., "Developing a Successful SemEval Task in Sentiment Analysis of Twitter and Other Social Media Texts", Language Resources and Evaluation, Jan. 2016, pp. 1-31.

Dai, X., et al., "From Social Media to Public Health Surveillance: Word Embedding based Clustering Method for Twitter Classification", Southeast Con 2017, pp. 1-7.

Gong, Y., et al., "Improving Image-Sentence Embeddings Using Large Weakly Annotated Photo Collections", ECCV 2014, pp. 529-545.

Lynch, C., et al., "Images Don't Lie: Transferring Deep Visual Semantic Features to Large-Scale Multimodal Learning to Rank", KDD Aug. 2016, pp. 1-8.

* cited by examiner

KEYWORDS 2392  LANGUAGE 14  IMAGE 240
MATCHES        PROCESSORS   RECOGNITION

| | CONFIDENCE | TYPE | ACTION |
|---|---|---|---|
| I'll continue working in Congress to protect people from gun violence & pass common sense | 98 | neutral | |
| By Newdesk with agency report Iraqi security forces have killed religious police chief of the Takfiri Daesh | 94 | report | |
| She is a psycho trying to save her arse | 98 | neutral | |
| @capuano_gary Gun battles | 55 | report | |
| SUZUKI GUN FOR PRESIDENT | 96 | neutral | |
| Sheriff's department officers investigate a potential stabbing after a victim has been taken away. | 84 | report | |
| Police investigating the Manchester suicide bombing evacuated homes after finding a car that may be significant | 60 | report | |
| When These Parents Were Stopped In A School Zone, Police Discovered Something Terrifying | 96 | neutral | |
| Police focus on white car in Manchester terror inquiry | 98 | report | |
| Staff with the Lewiston School District confirm that Lewiston High was evacuated this morning due to a bomb threat | 76 | report | |
| Police arrest suspected leader of group that carried out Paris terror attack | 88 | report | |
| Police be teefing ppl gold teeth and shi | 41 | neutral | |
| If he was black they'd have their guns pulled out in hand before even approaching him. | 93 | neutral | |
| Man arrested in theft of Portland train victim's ring | 86 | report | |

FIG. 3

| | CONFIDENCE | TYPE | ACTION |
|---|---|---|---|
| I'll continue working in Congress to protect people from gun violence & pass common sense | 98 | neutral | ☑ ⇔ ⇕ 値 |
| By Newdesk with agency report Iraqi security forces have killed religious police chief of the Takfiri Daesh | 94 | report | ☑ ⇔ ⇕ 値 |
| She is a psycho trying to save her arse | 98 | neutral | ☑ ⇔ ⇕ 値 |
| @capuano_gary Gun battles | 55 | report | ☑ ⇔ ⇕ 値 |
| SUZUKI GUN FOR PRESIDENT | 96 | neutral | ☑ ⇔ ⇕ 値 |
| Sheriff's department officers investigate a potential stabbing after a victim has been taken away. | 84 | report | ☑ ⇔ ⇕ 値 |
| Police investigating the Manchester suicide bombing evacuated homes after finding a car that may be significant | 60 | report | ☑ ⇔ ⇕ 値 |
| When These Parents Were Stopped In A School Zone, Police Discovered Something Terrifying | 96 | neutral | ☑ ⇔ ⇕ 値 |
| Police focus on white car in Manchester terror inquiry | 98 | report | ☑ ⇔ ⇕ 値 |
| Staff with the Lewiston School District confirm that Lewiston High was evacuated this morning due to a bomb threat | 76 | report | ☑ ⇔ ⇕ 値 |
| Police arrest suspected leader of group that carried out Paris terror attack | 88 | report | ☑ ⇔ ⇕ 値 |
| Police be teefing ppl gold teeth and shi | 41 | neutral | ☑ ⇔ ⇕ 値 |
| If he was black they'd have their guns pulled out in hand before even approaching him. | 93 | neutral | ☑ ⇔ ⇕ 値 |
| Man arrested in theft of Portland train victim's ring | 86 | report | ☑ ⇔ ⇕ 値 |

FIG. 13

EVALUATING CONTENT ON SOCIAL MEDIA NETWORKS

CROSS-REFERENCE TO RELATED APPLICATION

The present application claims the benefit of U.S. Provisional Application Ser. No. 62/579,432 for "Deep Learning-Based Social Monitoring", filed Oct. 31, 2017, which is incorporated by reference herein in its entirety.

TECHNICAL FIELD

The present document relates to techniques for monitoring social media networks.

DESCRIPTION OF THE RELATED ART

For various reasons, it is often useful to filter and/or restrict posted content in certain forums, such as social media networks. However, in many cases, the sheer volume of content in social media networks can make manual data filtering cumbersome. Moreover, manual data processing can be expensive, and can result in slower response times. This cost drawback, combined with high latency associated with manual data filtering, can render such manual methods for comprehensive social media data management impractical, especially for time-sensitive data.

SUMMARY

Described herein are various embodiments of a system and method that implement deep learning-based solutions to solve language and/or image prediction problems in social media network monitoring. The described techniques thus address relative inaccuracies associated with conventional statistical machine learning approaches that can render natural language processing (NLP) too unreliable to use effectively.

Recently, deep learning strategies have been implemented to solve NLP and image recognition problems. In general, however, many deep learning models require extensively curated training sets, and/or are only available for internal use. Since many problems in the digital media management space are custom, using a "one model fits all" strategy can be inappropriate in some circumstances.

For example, U.S. Pat. No. 9,483,544, entitled "Systems and Methods for Calculating Category Proportions," relates to a specific language classification algorithm. Application of conventional language processing to social media may result in inaccuracies and inefficiencies. There is no mention of deep learning natural language processing.

U.S. Pat. No. 9,355,091, entitled "Systems and Methods for Language Classification," relates to a language classification algorithm that appears designed to operate with very limited user involvement. This reference also does not teach deep learning natural language processing, and is subject to the inaccuracies and inefficiencies cited in conjunction with the prior art as a whole.

U.S. Patent Application Pub. No. 2016/0070748, entitled "Method and Apparatus for Improved Searching of Digital Content," relates to association of co-occurrences with search criteria. This reference relates to searching of a corpus of digital content, and does not directly address the problem of classification of social media communications.

In particular, existing third-party social media monitoring system do not implement deep learning NLP solutions on third-party social media data feeds, which would allow for analytics and monitoring on an aggregate of social media platforms. Furthermore, externally implementing deep learning NLP solutions allows for greater transparency, intelligibility, adaptability, and customization than internal NLP-based solutions.

Implementing NLP on an aggregate of many social media data feeds presents a unique challenge, as language style characteristics tend to vary across social media platforms. For example, an NLP solution that is well suited to solve language content originating from Facebook may not adapt well to language content originating from Twitter or Instagram.

Generating custom training sets targeting specific digital media management problems can often require the cooperation of multiple personnel, skilled in different arts. Furthermore, building such labeled data sets and having them available in a timely fashion for model improvement is a difficult task, typically requiring manual data processing, multiple file creations and transfers, and manual model rebuilds, all of which can take days, weeks or even months. To overcome these challenges, a system is described that enables the generation of custom training sets from real time and/or historical data, while simultaneously allowing for naive users to train and retrain deep learning models in a rapidly evolving environment. In some embodiments, this in-line, real time labeling process is coupled with the automatic assembly of training records that allows fast model retraining and customization, allowing fast modifications and tracking of emerging, transient or otherwise fast timescale phenomenon.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIG. 3 is a screenshot diagram depicting a keyword list view that may be displayed in response to user selection of the keyword panel of the chart view of FIG. 2, according to one embodiment.

FIG. 13 is a screenshot diagram depicting a screen that is presented in response to user selection of the keyword panel of the header of FIG. 12, according to one embodiment.

DETAILED DESCRIPTION OF THE EMBODIMENTS

Figure 1A:
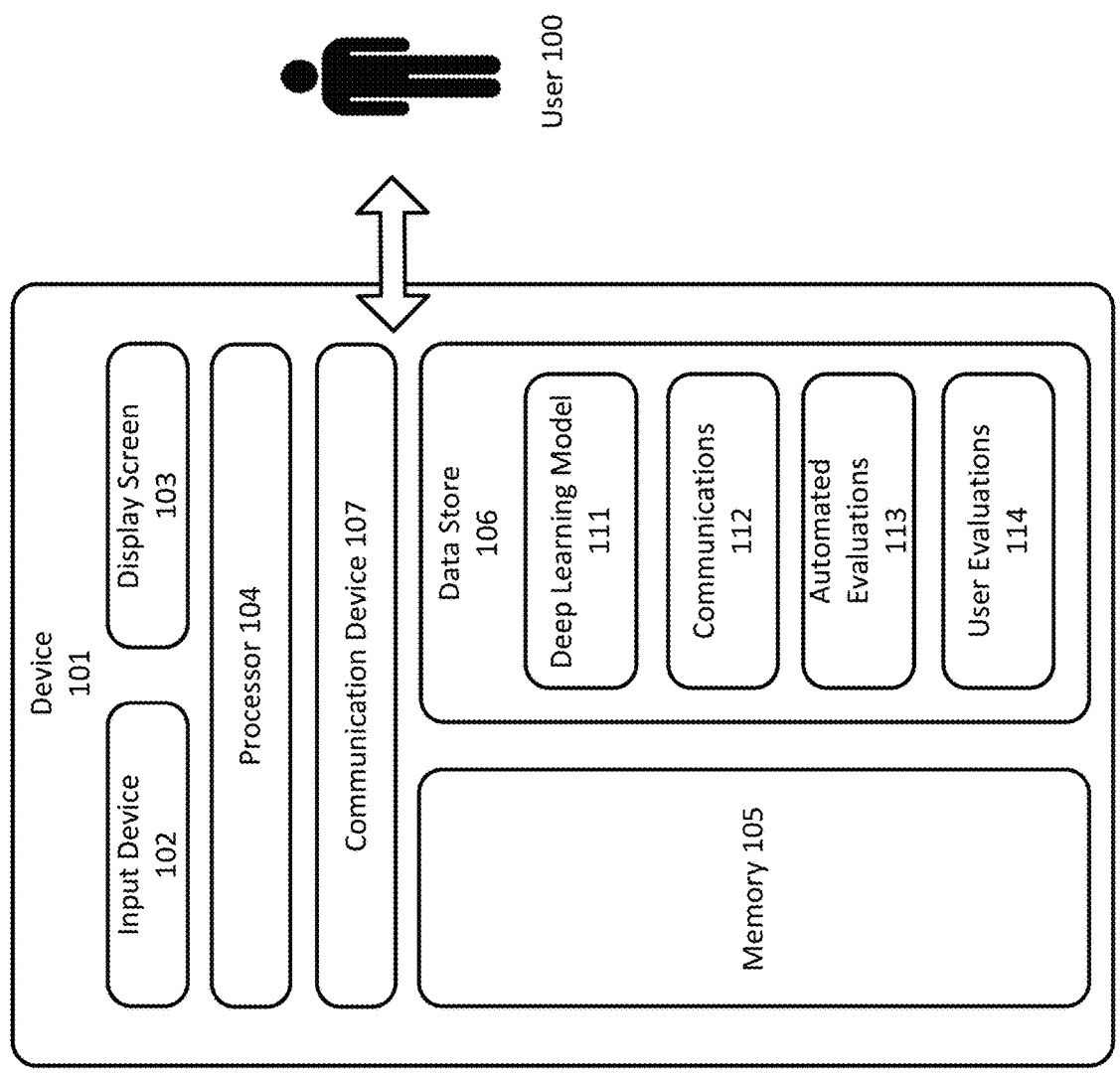
FIG. 1A is a block diagram depicting a hardware architecture according to one embodiment.

According to various embodiments, the system and method described herein provide several advantages over conventional mechanisms for managing, monitoring, and filtering social media. Such advantages may include, but are not limited to:

Increased accuracy in terms of determining which content does and does not meet predetermined criteria or policies;

Reduced latency, resulting in lower delays before new content can be evaluated and/or posted to the network; and Streamlined user involvement, requiring less time and effort to evaluate content, resulting in cost savings.

In this application, a "computing device" can be any device capable of processing digital data. A "processor" is a hardware element of a computing device that processes digital data. A "data store" is any device capable of digital short-term and/or long-term data storage. A data store may use any known hardware for nonvolatile and/or volatile data storage.

A "social network" is any computer-hosted platform on which peers can communicate with each other via media such as text, pictures, video, sounds, and/or the like. The term "social media network" is used interchangeably with "social network."

A "communication" is any type of correspondence, intended for human consumption, that has been sent or is to be sent over a social network. Accordingly, posts, texts, tweets, uploaded pictures, uploaded videos, and uploaded sound files are all examples of communications. Notably, a "communication" may be, but need not necessarily be, made available to the public; rather, a communication may only be made available to one or more peers on the social network. Further, a "communication" may not have been sent over the social network yet; rather, a "communication" may be uploaded to the social network, but may then be evaluated prior to transmission to the one or more peers that are intended to receive it.

A "deep learning model" is any algorithm or process by which any known deep learning techniques are employed to solve a problem, such as evaluation and/or categorization of data. Deep learning models include, but are not limited to, convolutional neural networks (CNNs), recurrent neural networks (RNNs) bidirectional long short-term memories (LSTMs), and hybrid neural networks.

An "automated evaluation" is a computer-generated evaluation of adherence of a communication to one or more criteria. An automated evaluation may include a binary indication of the content of the communication (i.e., the communication is or is not in compliance with a policy, or the communication does or does not relate to particular subject matter of interest), and/or a representation of probability that the content of the communication satisfies the one or more criteria (i.e., the communication is 80% likely to be compliant with a policy, or is 80% likely to relate to content of interest).

A "user evaluation" is a user-provided evaluation regarding whether the communication satisfies the one or more criteria. A user evaluation may include binary and/or probabilistic representations of satisfaction. In some embodiments, a "user evaluation" may simply include a decision made by a user with respect to the future propagation of a communication on a social network. For example, the user's decision of whether to allow, delete, escalate, or report the communication on the social network may constitute the "user evaluation" of the communication. In other embodiments, the "user evaluation" may simply be the user's guidance for training of a deep learning model, and may have no direct effect on the propagation of the communication on the social network. For example, a "user evaluation" may include an indication of whether to reinforce, escalate, de-escalate, or delete (i.e., ignore) an automated evaluation of a communication, for training purposes.

Figure 1B:
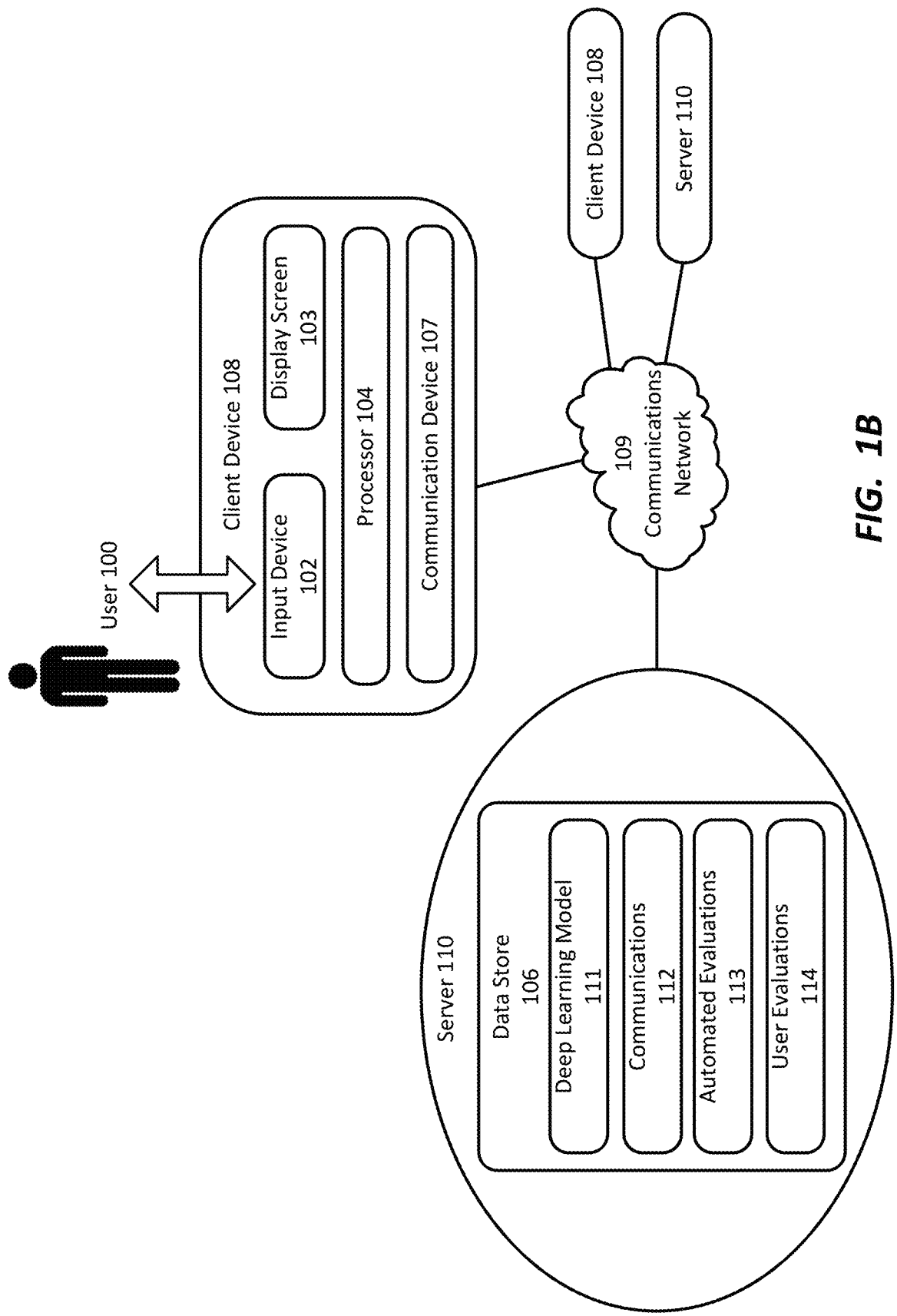
FIG. 1B is a block diagram depicting a hardware architecture in a client/server environment, according to one embodiment.

In some embodiments, one or more devices 101, client devices 108, and/or servers 110, as shown and described in FIGS. 1A and 1B, may be used to implement a system and method according to the present disclosure. Thus, in the figures and descriptions below, it will be understood that any of the components and/or method steps shown or described may be implemented in one or more of the devices 101, client devices 108, and/or servers 110.

System Architecture

According to various embodiments, the system can be implemented on any one or more electronic devices equipped to receive, store, and present information. Such an electronic device may be, for example, a desktop computer, laptop computer, smartphone, tablet computer, smartphone/tablet ("phablet"), wearable computing device, and/or the like. Any of a wide variety of device types, operating systems, and the like may be used. Accordingly, the following description is intended to illustrate various embodiments by way of example, rather than to limit scope.

Referring now to FIG. 1A, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 has a number of hardware components well-known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and retrieved by device 101 when needed for presentation to user 100. Data store 106 may store one or more data sets, which may be used for a variety of purposes and may include a wide variety of files, metadata, and/or other data. In at least one embodiment, data store 106 may include a deep learning model 111, communications 112 sent over, or intended to be sent over, a social network, automated evaluations 113 of the communications 112, user evaluations 114 of the communications 112, and/or other data (not shown), which may include any additional data that facilitates the implementation of social network monitoring. In at least one embodiment, deep learning model 111, communications 112, automated evaluations 113, user evaluations 114, and/or other data can be stored at another location, remote from device 101, and device 101 can access such deep learning model 111, communications 112, automated evaluations 113, user evaluations 114, and/or other data via any suitable communications protocol.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

Display screen 103 can be any element that displays information such as text and/or graphical elements. The display screen 103 may optionally display deep learning model 111, communications 112, automated evaluations 113, user evaluations 114, and/or other data such as other input and/or output related to the operation and performance of social network monitoring. The display screen 103 may display any known user interface elements, including elements that modify the presentation of information on the display screen 103. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

A communication device 107 may communicate with other computing devices through the use of any known wired and/or wireless protocol(s). For example, the communication device 107 may be a network interface card ("NIC") capable of Ethernet communications and/or a wireless networking card capable of communicating wirelessly over any of the 802.11 standards. The communication device 107 may be capable of transmitting and/or receiving signals to transfer data and/or initiate various processes within and/or outside the computing device 101.

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As in FIG. 1A, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1A, data store 106 may include deep learning model 111, communications 112, automated evaluations 113, user evaluations 114, and/or other data (not shown); alternatively, such deep learning model 111, communications 112, automated evaluations 113, user evaluations 114, and/or other data can be stored elsewhere (such as at another server) and retrieved as needed.

In addition to or in the alternative to the foregoing, deep learning model 111, communications 112, automated evaluations 113, user evaluations 114, and/or other data may also be stored in a data store 106 present in the client device 108. In some embodiments, deep learning model 111, communications 112, automated evaluations 113, user evaluations 114, and/or other data may have elements distributed between the server 110 and the client device 108 and/or other computing devices in order to facilitate secure and/or effective communication between these computing devices.

As in FIG. 1A, display screen 103 can be any element that displays information such as text and/or graphical elements. Various user interface elements, dynamic controls, and/or the like may be used in connection with the display screen 103.

As also set forth in FIG. 1A, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as also set forth in the description of FIG. 1A.

In one embodiment, some or all of the system can be implemented as software written in any suitable computer programming language, whether in a standalone or client/server architecture. Alternatively, some or all of the system may be implemented and/or embedded in hardware.

Notably, multiple servers 110 and/or multiple client devices 108 may be networked together, and each may have a structure similar to those of the client device 108 and the server 110 that are illustrated in detail in FIG. 1B. The data structures and/or computing instructions used in the performance of methods described herein may be distributed among any number of client devices 108 and/or servers 110.

Social Network Monitoring Overview

In various embodiments, the system and method can implement the following components, singly or in any suitable combination:

- User Interface: An interface that allows for interaction and creation of custom deep learning tools for social media monitoring.
- Language Algorithm: A set of custom deep learning NLP tools configured to solve social media natural language processing (NLP) problems.
- Multi-Task Learning Algorithm: A set of multiple deep learning models trained simultaneously to mitigate underrepresented data sets and help with generation.
- Transfer Learning Algorithm: A transfer learning scheme configured to aid in model convergence and generalization.
- Hyper-parameter Tuning Algorithm: An automated hyper-parameter tuning algorithm designed to enable adaptive deep learning models, tailored towards each client's custom training sets.
- Multi-Modal Algorithm: An algorithm designed to classify multimodal social media content using a feature-level decision policy that combines text and images, thus allowing users to classify any social media event in its entirety.

Each of these components will be discussed in greater detail in the description below.

User Interface

In at least one embodiment, a user interface is provided that allows users to manage and interact with third-party social media content. The interface may allow the user to filter, restrict, or otherwise limit distribution of the third-party social media content and/or recommend such actions to another party, such as the host of the third-party social media network from which the third-party social media content originated. Thus, the interface may be used to enforce the policies and procedures of a social network, such as its terms of use.

In at least one embodiment, the user interface brings into focus the most relevant and/or impactful communications 112 that have been transmitted, or are to be transmitted, over the social network, based on a specific user's needs. Actionable items are populated based on results of machine learning (ML) analysis of the communications 112. Optionally, only communications 112 with more than a threshold likelihood of meeting the criteria for review will be displayed for action. These criteria may include violation of a social network's terms of use, pertinence to a particular topic of interest, content of a particular nature, and/or the like.

A user can use the interface to monitor a social media feed and corresponding ML results, which may include automated evaluations 113 of the communications 112. The automated evaluations 113 may relate to one or more specific problems. For example, the interface can be used to monitor a social media network for one or more of the following:

- Threats;
- Harassment;
- Pornography;
- Obscenity;
- Other offensive content;
- Content that is otherwise against the policies applicable to the social network on which it is to be transmitted;
- Content that pertains to a particular topic of interest;
- Complaints;
- Slander;
- Conversations that relate to brand reputation;
- Understanding positive or negative products, services, or companies;
- Categorizing linguistic semantics pertaining to specific products; services, or companies; and/or
- Conversations related to the financial industry.

The interface may enable the user to take action such as censoring, flagging such posts for deletion or review, further analysis, and/or other action. In at least one embodiment, the interface allows the user to click on each item (corresponding to a social media post, for example) to reveal further content related to the post. Any of several actions can be taken with respect to each post, which may include, but are not limited to:

- Discard/ignore the post;
- Use the post to modify the deep learning model 111 by reinforcing the ML training set;
- Use the post to modify the deep learning model 111 by notifying the ML algorithm of a misclassification; and
- Modify the content within the post and send it back to the ML algorithm to further assist in modification of the deep learning model 111 via retraining.

Figure 2:
FIG. 2 is a screenshot diagram depicting a chart view module of a user interface, according to one embodiment.

Referring now to FIG. 2, there is shown an example of a chart view module 200, which brings into focus particular communications 112 above an ML classification threshold, according to one embodiment. The ML classification threshold may be, in some examples, a threshold probability that the communication 112 is in violation of one or more policies applicable to the social network on which it is to be communicated.

In this example, ML classification results in the form of automated evaluations 113 are shown on a vertical axis 210, and corresponding time of the communication 112 is shown on a horizontal axis 220. A vertical line 230 indicates a communication 112 with a corresponding automated evaluation 113 above a particular threshold. Actionable items associated with various keywords, language ML, or image ML results are shown in the top right panel, in a keyword panel 240, a language panel 250, and an image panel 260.

Clicking or tapping on the keyword panel 240, the language panel 250, or the image panel 260 may optionally filter the results displayed in the chart view module 200 to show only the selected type of communication 112 or automated evaluation 113. Additionally or alternatively, such action may take the user to a list view pertaining to the selected type of communication 112 or automated evaluation 113. In the list view, the user may select which of the actions listed above should be taken with respect to the communication 112.

FIG. 3 depicts an example of a keyword list view 300 that may be displayed in response to user selection of the keyword panel 240, according to one embodiment. The keyword list view 300 may list communications 112 that have been flagged for user review based on keyword content, including automated evaluations 113 and keyword actions 310 that can be taken with respect to communications 112. Each item in the keyword list view 300 represents communications 112 with keyword matches from a social media feed, and a corresponding automated evaluation 113 provided via application of the deep learning model 111. The automated evaluation 113 may include, for each of the communications 112 in the keyword list view 300, a classification type 320 and a confidence level 330, which may be a probability that the communication 112 has the classification type 320 indicated. In this example, the keyword list view 300 is shown with the textual content 340 of each communication 112, in addition to the automated evaluation 113.

The keyword actions 310 are shown on the right-hand column, and may constitute user evaluations 114 that can be used to modify the deep learning model 111 via training. For example, the blue checkbox 350 reinforces the automated evaluation 113, the red up arrow 360 escalates the automated evaluation 113, the green arrow 370 de-escalates the automated evaluation 113, and the black trash bin 380 discards the communication 112 so that it is excluded from any further training of the deep learning model 111.

In at least one embodiment, once a user selects the image panel 260, for example, from the chart view module 200 or the keyword list view 300, an image view is activated. In the image view, the user may specify which of the above-listed actions should be taken with respect to a communication 112 that has been flagged based on image content.

Figure 4:
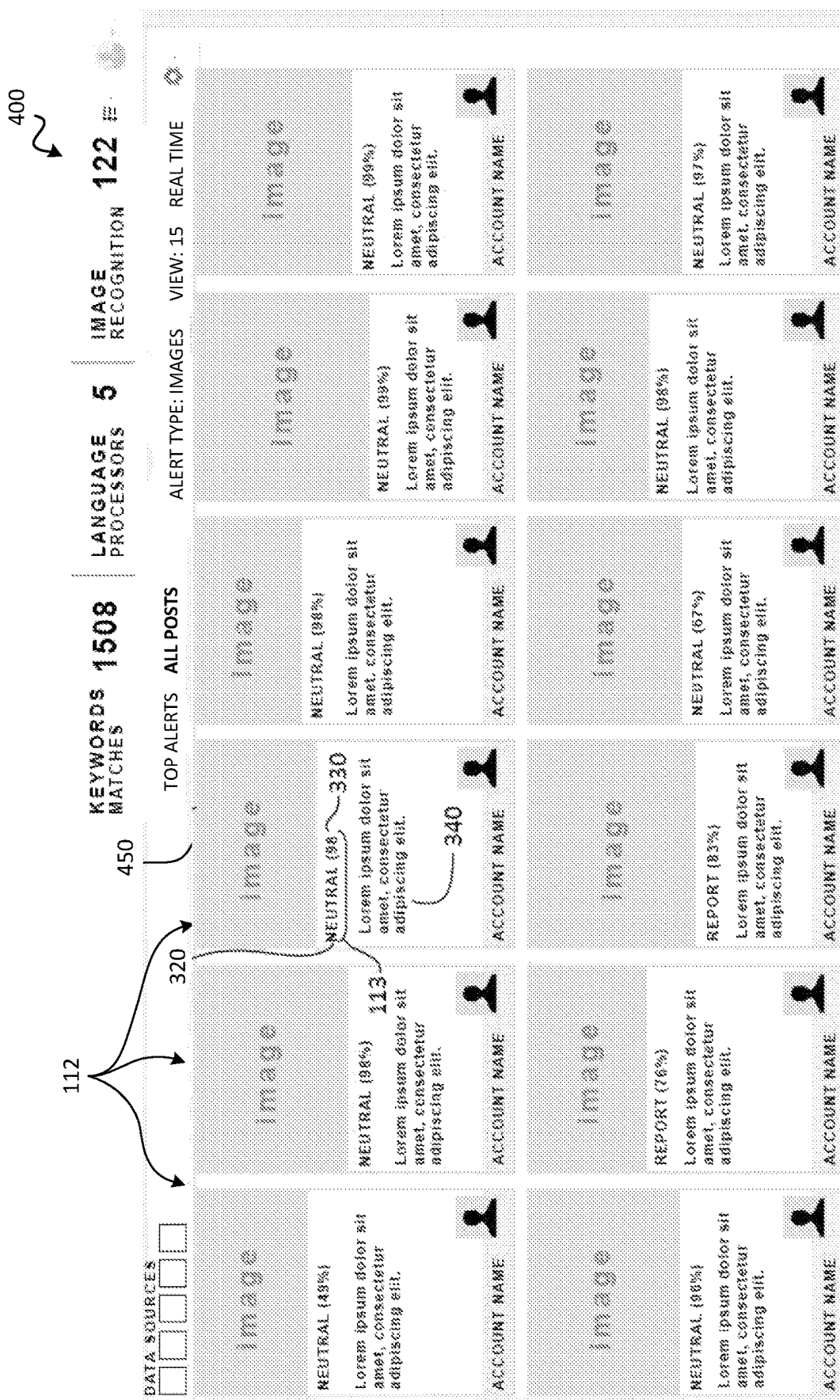
FIG. 4 is a screenshot diagram depicting an image list view that may be displayed in response to user selection of the image panel of the chart view of FIG. 2, according to one embodiment.

FIG. 4 depicts an image list view 400 that may be displayed in response to user selection of the image panel 260, according to one embodiment. The image list view 400 depicts communications 112 that have been flagged for user review based on possible image content. In particular, each of the communications 112 in FIG. 4 represents an image classification match from a social media feed. As in the keyword list view of FIG. 3, the corresponding automated evaluation 113 is displayed, including the classification type 320 and confidence level 330 provided by application of the deep learning model 111.

As depicted in FIG. 4, textual content 340 of each communication 112 is shown, along with an image 450 from the communication 112 that accompanies the textual content 340. In at least one embodiment, the automated evaluation 113 for each communication 112 is provided by the deep learning model 111 based on a combination of the textual content 340 and the image 450.

In some embodiments, the image list view 400 may provide image actions that are similar to the keyword actions of the keyword list view 300. For example, for each communication 112 in the image list view 400, the user may select whether to reinforce, escalate, de-escalate, or delete a communication 112 from further modification of the deep learning model 111. Icons (not shown) that are the same as, similar to, or different from the blue checkbox 350, the red up arrow 360, the green arrow 370, or the black trash bin 380 may be used.

Figure 5:
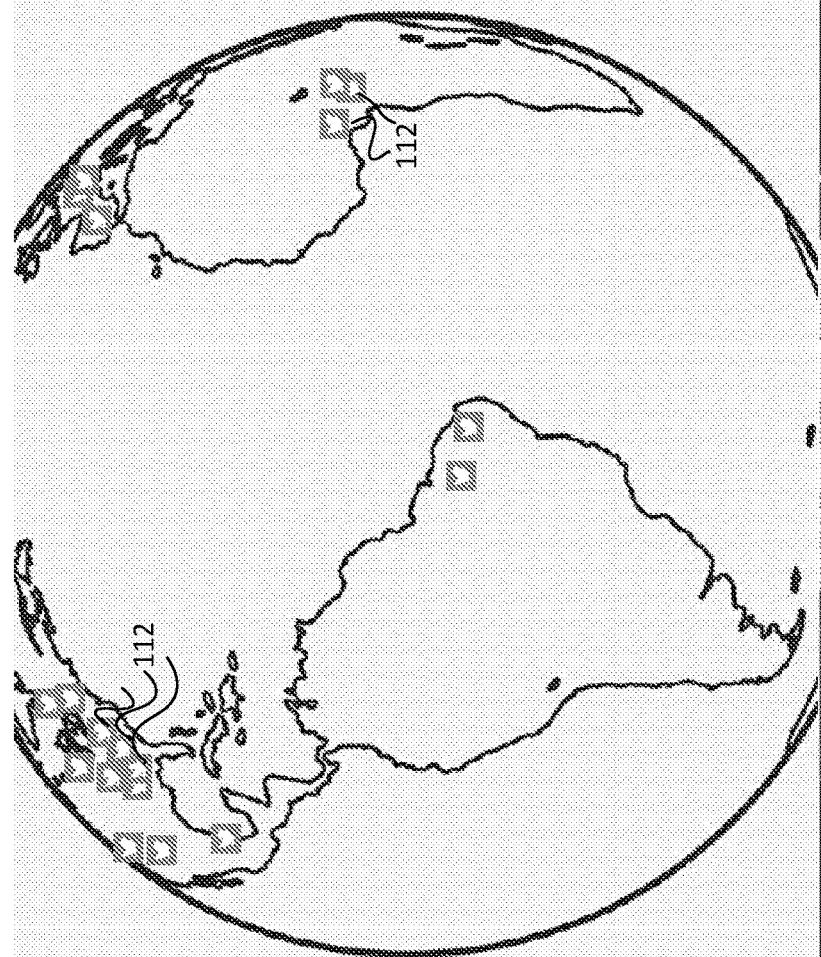
FIG. 5 is a screenshot diagram depicting a location view, including geolocations of communications under review, according to one embodiment.

The location from which a communication 112 was generated may provide useful context to a user reviewing the communications 112. In at least one embodiment, communications 112 can be presented on a globe or map, so as to depict geolocation in a visual manner. FIG. 5 depicts one such embodiment.

FIG. 5 is an example of a location view 500, including geolocations of communications 112 under review, according to one embodiment. In at least one embodiment, the user can hover a cursor or mouse over each communication 112 to reveal detailed information; the user can also click or tap on a communication 112 to further unlock various ML client-side interaction tools, which may include, but are not limited to, any of those disclosed in conjunction with the keyword list view 300 or the image list view 400.

Figure 6:
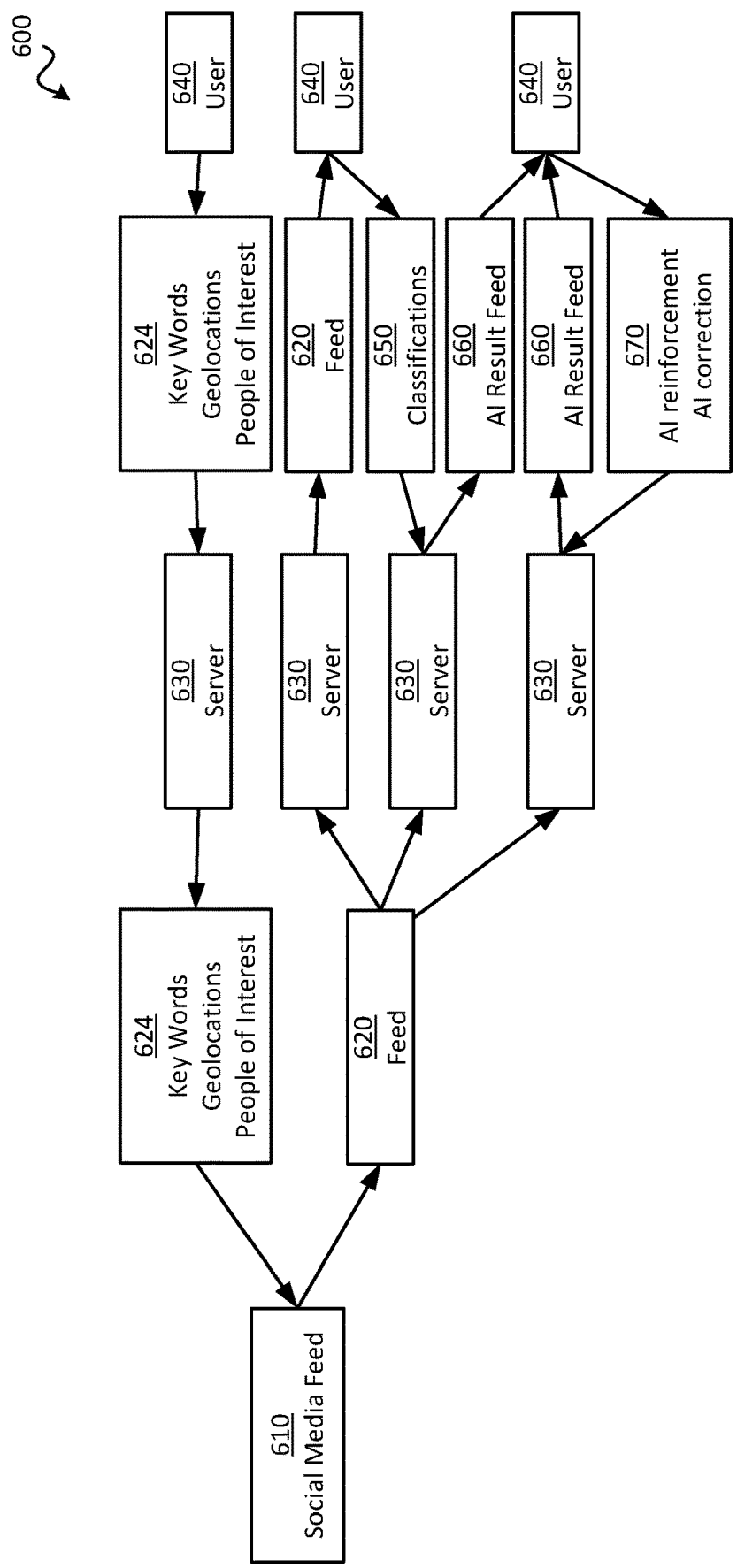
FIG. 6 is a flow chart depicting various connected components of the user interface according to one embodiment.

FIG. 6 is a flow chart 600 depicting various connected components of the user interface according to one embodiment. A social media feed 610 may provide a feed 620 including communications 112 that have been or are to be disseminated over the social network. The feed 620 may optionally include only communications 112 that relate to keywords, geolocations, and/or people of interest 624, which may be provided by one or more users 640 via one or more servers 630.

The feed 620 may be received by one or more servers 630, which may be servers 110 as in FIG. 1B. In some embodiments, the one or more servers 630 may be controlled by a party different from the host of the social network providing the social media feed 610. Thus, the social network monitoring carried out in the flow chart 600 may optionally be external monitoring, carried out by an entity different from the proprietor of the social network.

The feed 620 may be provided by the one or more servers 630 to one or more users 640. The one or more users 640 may provide classifications 650, into which the feed 620 can be clustered. The one or more servers 630 may apply the classifications 650 to the feed 620 to provide an all results feed 660 to the one or more users 640. The ML results feed 660 may be provided along with automated evaluations 113, as in FIGS. 2, 3, 4, and/or 5. The one or more users 640 may provide ML reinforcement and/or ML correction 670, which may be used to tune the selection of communications 112 included in the feed 620 and/or the all results feed 660, and/or to tune the manner in which automated evaluations 113 are provided for such communications 112.

Language Algorithm

Neural network models such as convolutional neural networks (CNN) and recurrent neural networks (RNN) are able to achieve remarkable performance in image and language classification, respectively. A variant of RNNs, referred to as bidirectional long short-term memory (LSTM), has emerged which has been shown to perform particularly well on sentence representation and text classification. LSTMs are well suited to capture local and global features within a sentence. Additionally, LSTMs tend to maintain accuracy when small training sets are used. In at least one embodiment, the system employs deep learning, wherein relationships among data items are developed based on nonlinear processing of multiple layers of feature representations.

However, the accuracy of any deep learning model is limited by the quality of the underlying training set. In time-sensitive fields, such as third-party social media monitoring, language tendencies rapidly change; therefore, the associated deep learning models need to adapt in order to maintain their effectiveness. Accordingly, in at least one embodiment, the system and method include an NLP application that allows users to design and modify custom deep learning models that have the versatility to be trained by a naïve user for a wide variety of applications.

In at least one embodiment, the algorithm includes three steps. First, embeddings are found for each word using an unsupervised learning approach. During training, a word vector space is populated that represents word-word co-occurrence statistics within a corpus. This step is conducted on a large corpus of words, typically ranging in the billions. Any of a number of open source pre-trained models can be used.

In a second step, the resulting word vector space is used to embed all words prior to training or predicting. Classifications of each embedded sentence are found using a supervised learning routine. In various embodiments, any type of deep learning algorithm or technique can be used, such as, for example, an LSTM-based algorithm, CNNs, RNNs, and/or hybrid neural networks, providing the deep learning model 111.

In a third step, communications 112 from one or more social media networks are fed into the deep learning model 111, and the results are displayed to the user. The user can then choose from a set of training actions, such as the keyword actions 310 of FIG. 3. The user can use the social media instance to reinforce the supervised learning training corpus by indicating whether the deep learning model 111 predicted the correct category or the sentence needs to be re-categorized. Over time, the deep learning model 111 learns to mimic the classification tendencies of the particular user.

Computational Architecture

Figure 7:
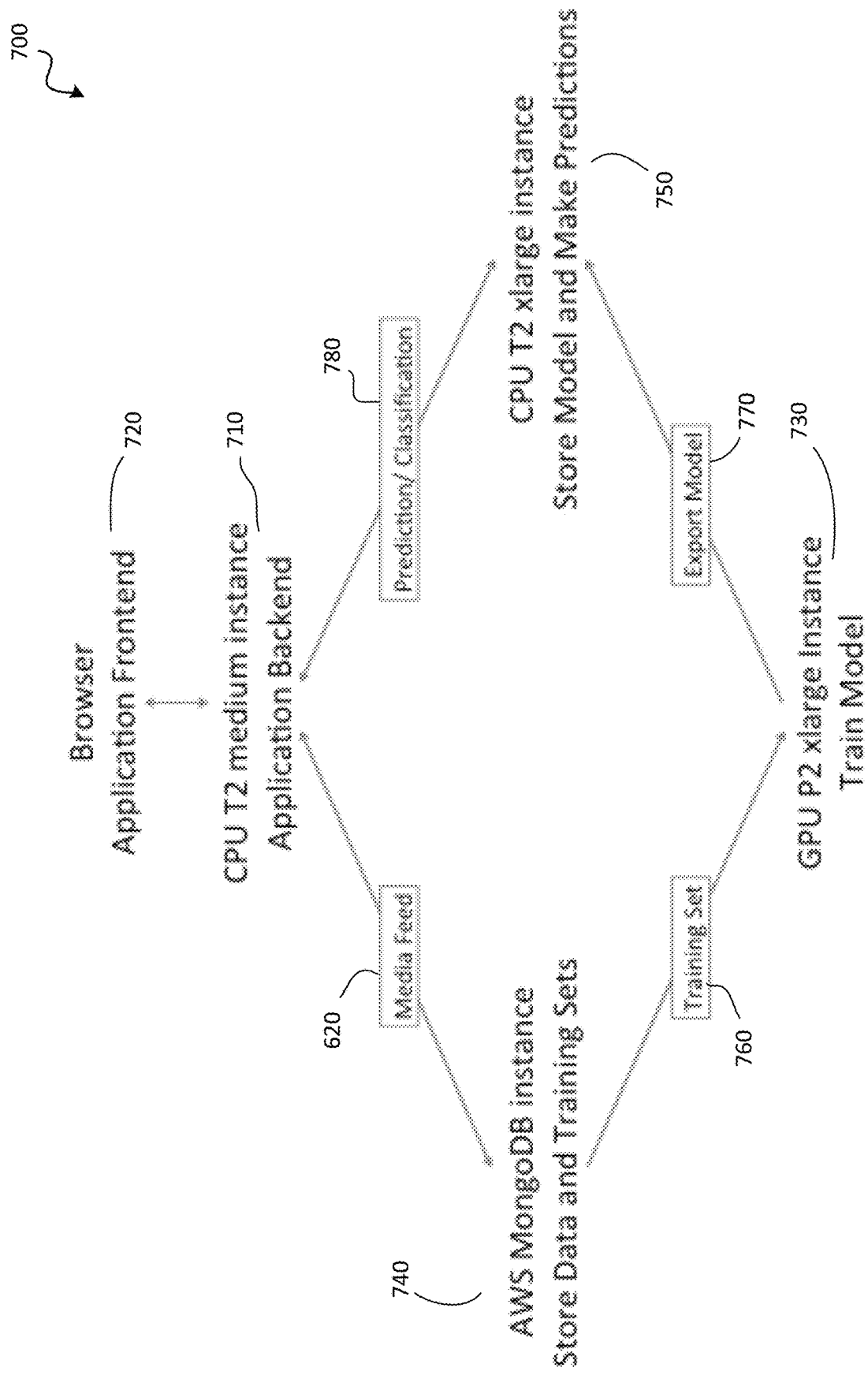
FIG. 7 is a schematic block diagram depicting a computational architecture that is used for implementing a deep learning model, according to one embodiment.

Referring now to FIG. 7, there is shown an example of a computational architecture 700 that is used for implementing the deep learning model 111 described herein, according to one embodiment, including components for implementing a server backend 710 and a client/user frontend 720, which may be implemented on the server 110 and the client device 108, respectively, of FIG. 1B. The client/user frontend 720 may optionally be delivered in a web-based format, such as a web browser. The deep learning model 111 may generally operate on the server backend 710.

Additionally, in FIG. 7, the communication between the various components is shown. These may include A GPU P2 xlarge instance 730, an AWS MongoDB instance 740, and a CPU T2 xlarge instance 750. The feed 620 may be conveyed between the server backend 710 and the AWS MongoDB instance 740. A training set 760 may be conveyed by the AWS MongoDB instance 740 to the GPU P2 xlarge instance 730. An export model 770 may be conveyed by the GPU P2 xlarge instance 730 to the CPU T2 xlarge instance 750. Predictions/classifications 780 may be conveyed between the CPU T2 xlarge instance 750 and the server backend 710.

In at least one embodiment, the training phase of the deep learning model 111 is implemented on one or more graphics processing units (GPUs), using, for example, NVIDIA's compute unified design architecture (CUDA). GPU implementation may speed up the training process significantly as compared to conventional CPUs. Thus, the GPU P2 xlarge instance 730 may be used for training. Higher level languages, such as Pytorch, Caffe, Keras, and TensorFlow, can also be used to train the deep learning model 111 using GPUs or CPUs. In at least one embodiment, the system is implemented using a dynamic model training and exporting architecture, in order to mitigate costs.

In one embodiment, once a training event is initialized, the training set is imported to a GPU instance, for example on Amazon Web Services (AWS) (for example, the AWS MongoDB instance 740) or some similar architecture. The training takes place on a computationally intensive instance and upon completion of the training event, the deep learning model is exported to a CPU instance (for example, the CPU T2 xlarge instance 750), which is used for prediction. In at least one embodiment, the GPU instance is programmatically shut off once exportation of the deep learning model 111 is complete.

Any suitable database architecture can be used. In at least one embodiment, MongoDB is used to manage the database of incoming media instances, user-specific tendencies, user preferences, training sets, keyword sets, security information, training sets, prediction models, and/or customer information.

Any suitable server language can be used. In at least one embodiment a central Node.js hub is used to direct and dispatch network traffic between the various data feeds, such as Twitter or Instagram, and the rest of the application such as the training and prediction instances, as well as the user interface.

Although the system and method are described herein in terms of deep learning, any suitable machine learning architecture can be used.

Figure 8:
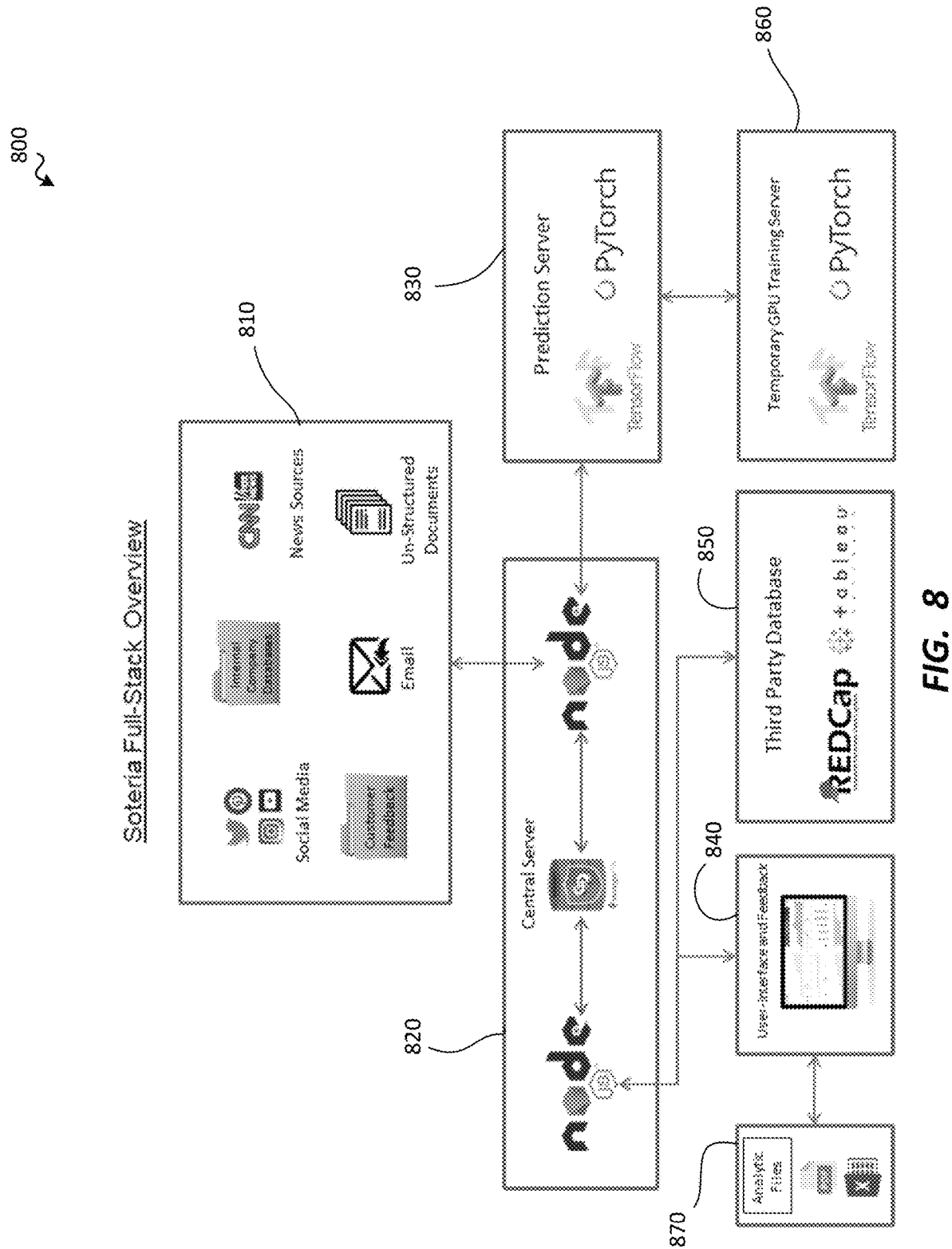
FIG. 8 is a schematic block diagram depicting an exemplary computational architecture for the system, according to one embodiment.

FIG. 8 is a schematic block diagram depicting an exemplary computational architecture 800 for the system, according to one embodiment. As shown, one or more social networks 810 may provide communications 112 of one or more types, which may be received in a central server 820. The central server 820 may communicate with a prediction server 830, a user interface 840, and a third-party database 850. The prediction server 830 may communicate with a temporary GPU training server 860, and the user interface 840 may access analytic files 870.

Multi-Task Learning Algorithm

Social media ML training datasets sets can vary depending on the application. However, there are often underlying deep feature level characteristics that are shared throughout a diverse array of training data sets. When undersampled data sets are used, over-fitting can be present. By training a conglomeration of models simultaneously, the deep features of the various models can be shared, thus improving validation accuracy compared to an individual model trained in isolation. By utilizing a multi-task learning deep learning scheme for image, text, and multimodal deep learning tasks, the deep learning models are able to achieve better generalization and validation accuracy.

In at least one embodiment, a multi-task deep learning network is trained using any combination of LSTMs, fully-connected layers, or convolutional layers. A multi-task network may include a core portion comprised of one or more computational layers that shares information across several different tasks. The network also includes a portion devoted to learning a single task, which is comprised of one or more computational layers. The single task portion of the network can take the form of one or more input computational layers or one or more computational output layers. The single task portions can run in parallel or series to the multi-task portion of the network and can be concatenated to or residually connected to the multi-task portion of the network.

Figure 9:
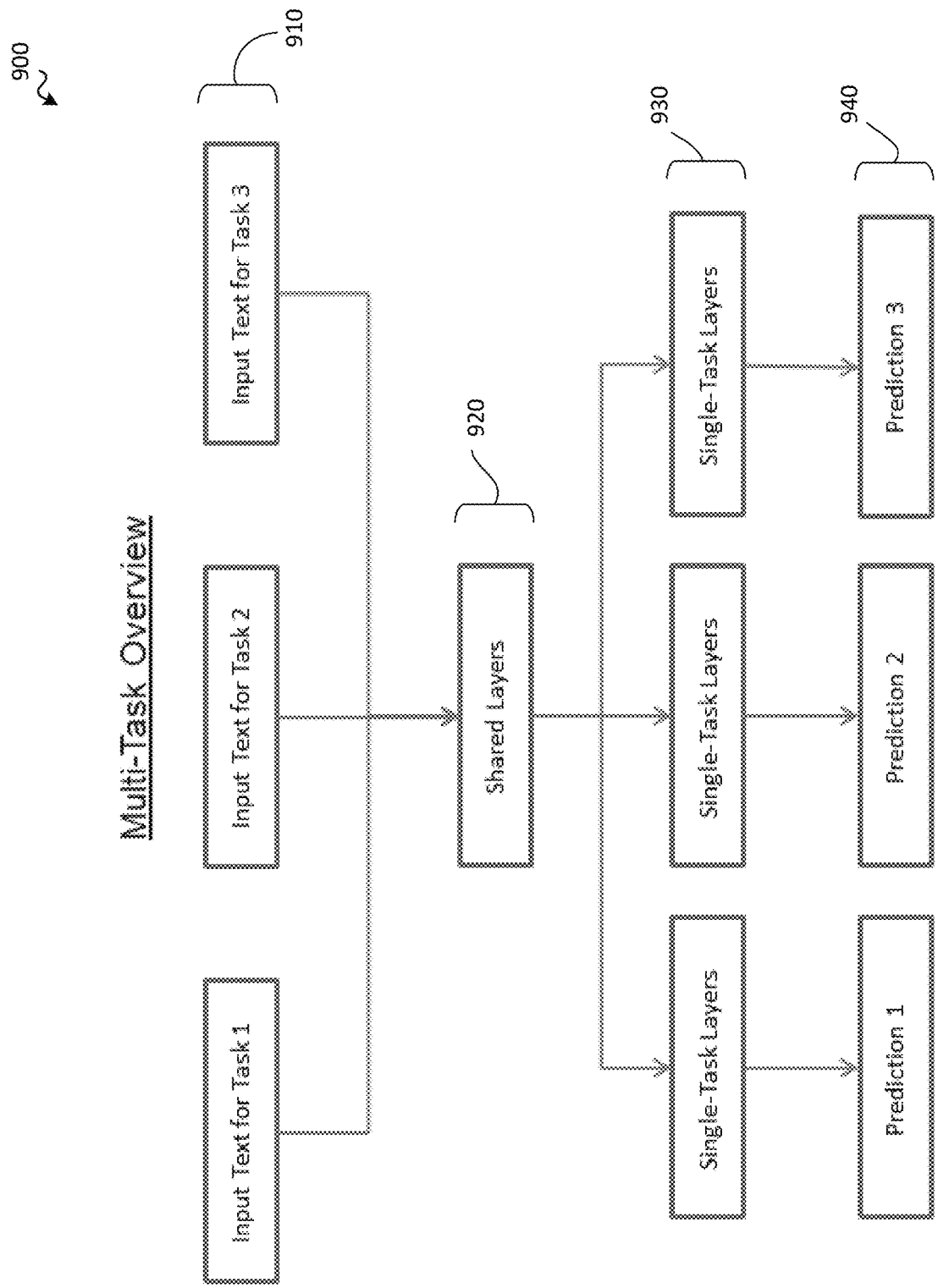
FIG. 9 is a schematic block diagram depicting an exemplary computational architecture for a multi-task learning-based module, according to one embodiment.

FIG. 9 is a schematic of an exemplary computational architecture 900 for a multi-task learning-based module, according to one embodiment. As shown, one or more input texts 910 may be received in a one or more shared layers 920, which may engage one or more single-task layers 930 to provide predictions 940.

Transfer-Learning Algorithm

The parameters of a machine learning model are often randomly initialized. Utilizing a marinade of optimization strategies such as stochastic gradient decent, dropout, and momentum, can help a model reach convergence. However, a third-party social media deep learning NLP model trained from scratch can succumb to local minima. Furthermore, models trained using small data sets can have difficulty generalizing. To overcome these challenges, in at least one embodiment, a transfer-learning scheme is used, so as to improve validation accuracy and overall generalization by training deep learning third-party social media NLP models on a dataset consisting of millions of labeled data points, then transferring the lower level parameter weights to a new dataset. By utilizing a transfer-learning scheme for image, text, and multimodal deep learning tasks, each learning model achieves better generalization and improved training validation accuracy.

In at least one embodiment, a transfer learning training protocol is described that consists of any combination of LSTMs, fully-connected layers, and/or convolutional layers. A network is trained on a task with sufficient data. Once the network is adequately trained and the network weights and biases have been determined, the model is trained on a new task. When the model is trained on a new task, the previously trained parameters are transferred to the new task.

In at least one embodiment, one or more layers of the network can be randomly initialized prior to training the network on the new task, but some of the original parameters will start from their previously trained values.

In at least one embodiment, one or more layers or individual parameters are locked and not updated during training of the new task.

Figure 10:
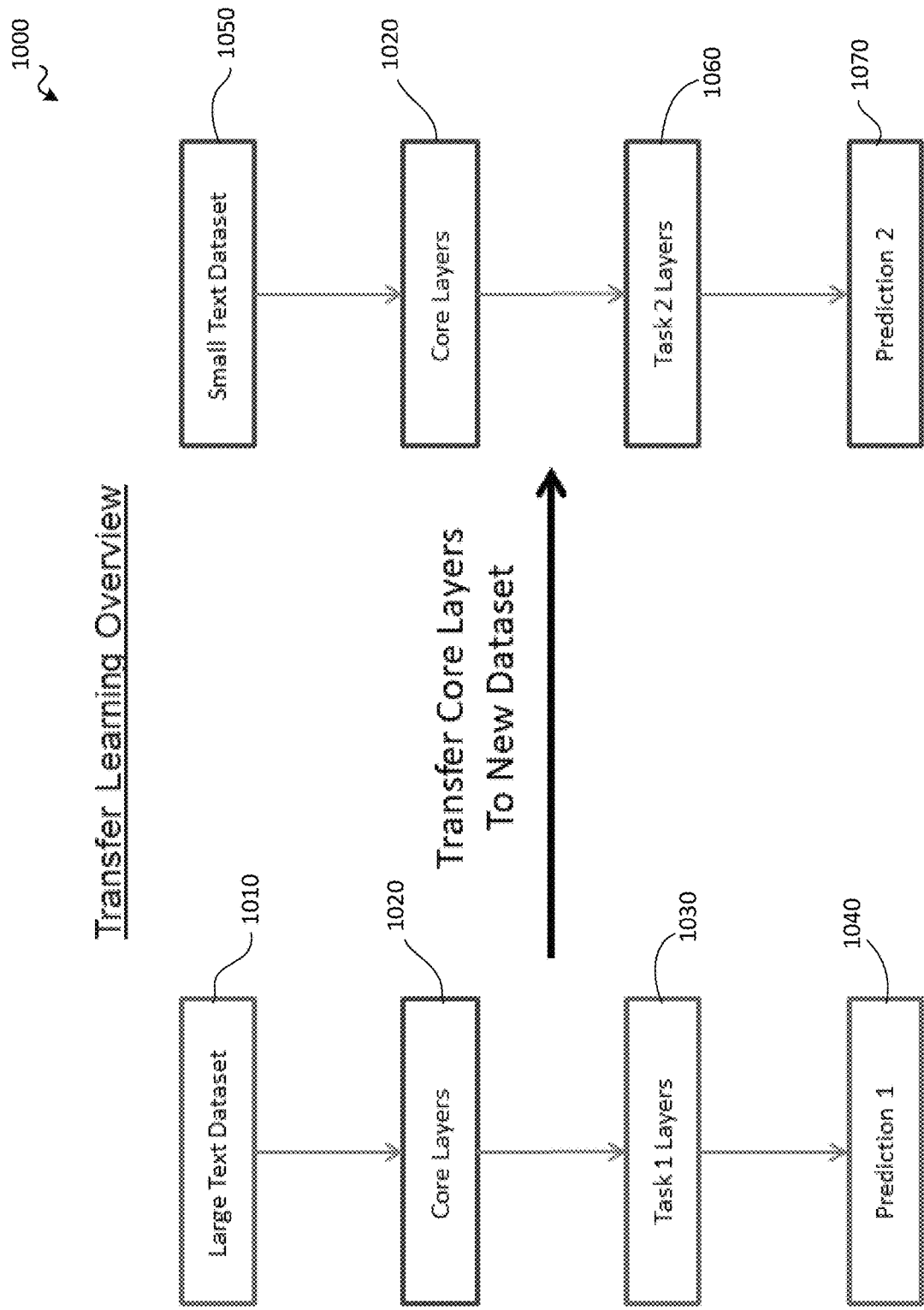
FIG. 10 is a schematic block diagram depicting an exemplary transfer learning architecture, according to one embodiment.

FIG. 10 is a schematic of an exemplary transfer learning architecture 1000, according to one embodiment. As shown, a large test dataset 1010 may be processed through one or more core layers 1020 and one or more task 1 layers 1030 to perform a first task, providing a first prediction 1040. This may result in training of the core layers 1020 and/or the task 1 layers 1030. The core layers 1020 may be transferred to a new data set, such as a small text dataset 1050, to solve a second task. The small text dataset 1050 may be processed through the core layers 1020 and one or more task 2 layers 1060 to provide a second prediction 1070. The parameters of the core layers 1020 may remain after the core layers 1020 have been transferred for use in the small text dataset 1050.

Hyper-Parameter Tuning Algorithm

The performance of deep learning models, such as the deep learning model 111, on a given data set, depends greatly on the overall structure of the model, as well as on the underlying hyper-parameters of a given architecture. Typically, overall architecture and corresponding hyper-parameters are chosen manually. However, manual manipulation of a deep learning model can be cumbersome and is not ideal for delivering custom models geared towards a wide range of tasks, in real time. To provide clients with the most ideal third-party social media deep learning-based NLP model, for their specific social media problem, an automated architecture generator and hyper-parameter tuning optimization algorithm can be used. For example, a gradient-descent algorithm finds the ideal model architecture and its corresponding hyper-parameters, such as the batch size, number of epochs, number of neurons, dropout, momentum, learning rate, convolutional kernel dimensions, and zero padding size. By building each client's model using the methodology described herein, an accurate deep learning model can be generated by a naïve user. In other embodiments, other techniques can be used in place of gradient descent, such as for example simulated annealing, simplex algorithm, and/or reinforcement learning to select the most appropriate architecture and the underlying hyper-parameters.

Multi-Modal Algorithm

Analyzing images and text separately can obfuscate much of the context surrounding a piece of social media. Often, analyzing a single media instance in isolation can lead to misclassification. If, instead, a communication 112 is evaluated as an ensemble of text, social networks, geolocation, images, videos, and/or audio information, then the true meaning and proper automated evaluation 113 can be determined with a higher degree of accuracy.

In at least one embodiment, the system employs a deep learning feature-level multimodal algorithm that incorporates all available information surrounding a social media instance. This approach overcomes several limitations and problems associated with existing systems.

As mentioned above, the system and method can be employed with deep learning and/or with any other type of machine learning architecture, singly or in any suitable combination. In at least one embodiment, a statistical correlation can be established between two or more modes, so as to provide effective combinations of data across different axes.

Examples of implementations with different types of content are described below.

A: Text and Image Fusion

Classification of social media content is central in understanding, coping, and predicting social landscapes in many industries. Existing, decision-level fusion techniques generally only allow either a language or image model to be used, obfuscating information that would result from combining both modalities.

According to at least one embodiment, the system and method described herein apply a multimodal machine learning strategy to social media monitoring and classification problems. Specifically, the system and method use a deep learning algorithm that classifies multimodal social media content using a feature-level decision policy.

In at least one embodiment, a CNN is used for the image classification component of the model, and a bidirectional LSTM is used for the text classification portion. One skilled in the art will recognize, however, that other techniques can be used. In at least one embodiment, a feature-level classification decision policy is implemented by combining the hidden states of the CNN and bidirectional LSTM models. For the CNN model, a variant of the dense net architecture can be used. The hidden state of each model concatenates to form a single output state. The hidden state of each model is enforced to be the same size, which prevents redundant retraining of the models. To achieve this, in at least one embodiment, part of the hidden state is assigned zeros if one modality does not exist. For instance, if a social media instance only contains text, then the hidden state associated with the image classification CNN model is assigned zeros. Since zeros in the hidden state do not propagate through neural networks, the multimodal algorithm does not compromise the accuracy when a single modality is used.

B: Location and Instance Fusion

The semantics of social media instances can vary between regions as word associations, and image meanings tend to change depending on the geographical locations of social media instances. In at least one embodiment, the system and method use a machine learning ensemble that incorporates geographical locations into the underlying classification model. A social media instance is evaluated as the aggregate of the content of the instance as well as the geographical association of the instance.

C: User Background and Instance Fusion

The meaning of a social media instance can change depending on the background and characteristics of the user associated with the instance. In at least one embodiment, the system and method use a machine learning strategy that coalesces the content of the instance, the background of the instance creator, and/or any relevant entities mentioned within the instance, to form a comprehensive classification model that outperforms any isolated monomodality classification algorithm.

D: Timing and Instance Fusion

The importance of a social media instance can depend on the time of creation of the instance. The time of day, week, month, or year can have an effect on the semantics associated with a particular social instance. In at least one embodiment, the system and method use a machine learning strategy that learns to associate instance classification with instance time of creation.

E: Full Multimodal Fusion

Any or all of the above-described techniques can be used singly or in any suitable combination with one another, so as to provide a comprehensive instance classification model.

One skilled in the art will recognize that further variations are possible.

Figure 11:
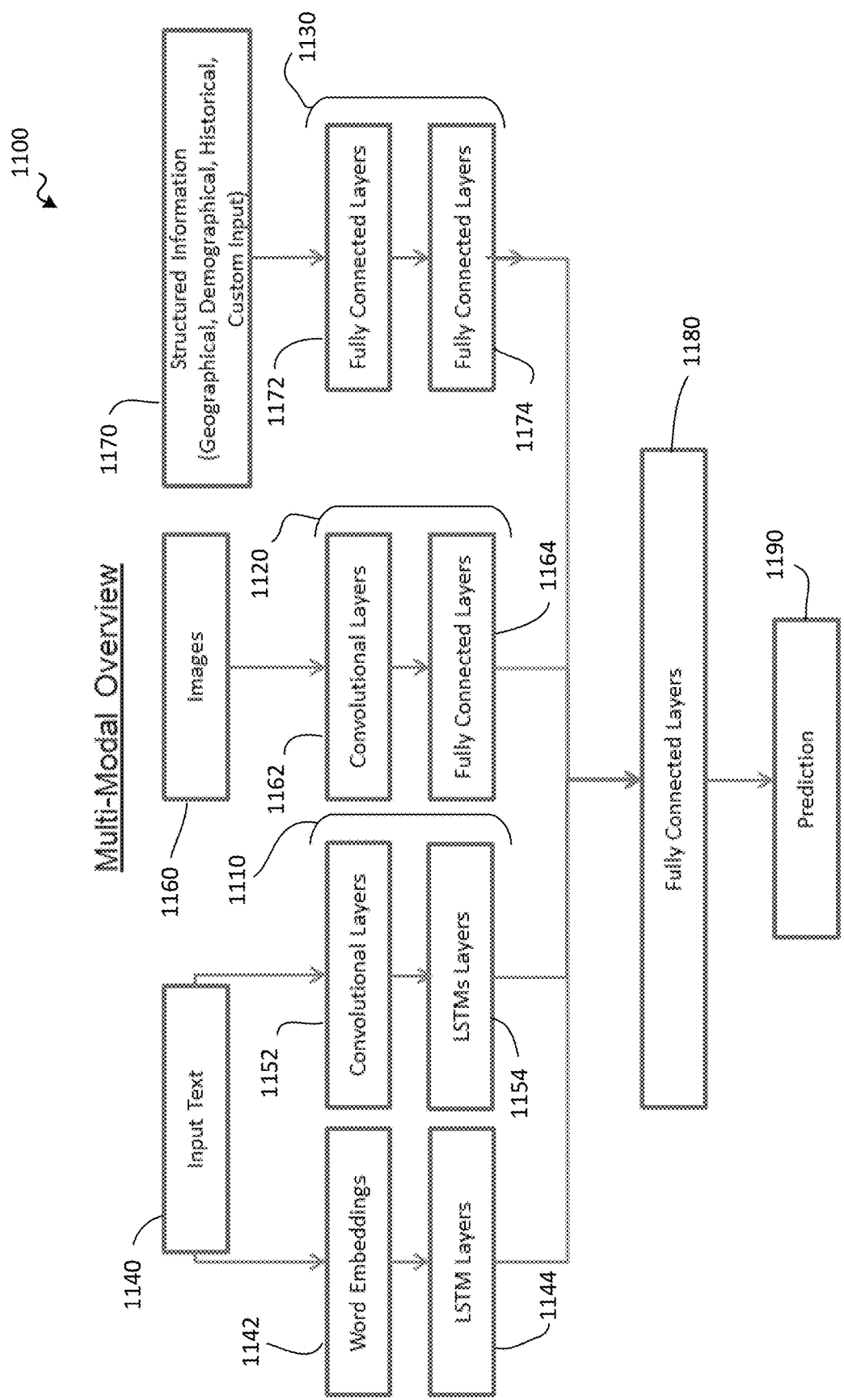
FIG. 11 is a schematic block diagram depicting an exemplary multimodal architecture, according to one embodiment.

FIG. 11 is a schematic of an exemplary multi-modal architecture 1100, according to one embodiment. The architecture of FIG. 11 may employ a hybrid word embedding and convolutional language classification model 1110, an image classification model 1120, and a structured data classification model 1130. The convolutional language classification model 1110 may process input text 1140 through word embeddings 1142 to LSTM layers 1144, and through convolutional layers 1152 to LSTM layers 1154. The image classification model 1120 may process images 1160 through convolutional layers 1162 to fully connected layers 1164. The structured data classification model 1130 may process structured information 1170 through fully connected layers 1172 to fully connected layers 1174. The structured information 1170 may include geographical, temporal, demographic, user background information, and/or custom user input information.

The LSTM layers 1144, the LSTM layers 1154, the fully connected layers 1164, and the fully connected layers 1174 may be connected to define fully connected layers 1180. The fully connected layers 1180 may thus incorporate text, image, and/or structured information to provide a prediction 1190 of greater accuracy than could be obtained by operation of the convolutional language classification model 1110, the image classification model 1120, or the structured data classification model 1130, alone.

Workflow Examples

FIGS. 12 through 15 depict examples of screen shots for a user interface for implementing the techniques described herein, according to one embodiment.

Figure 12:
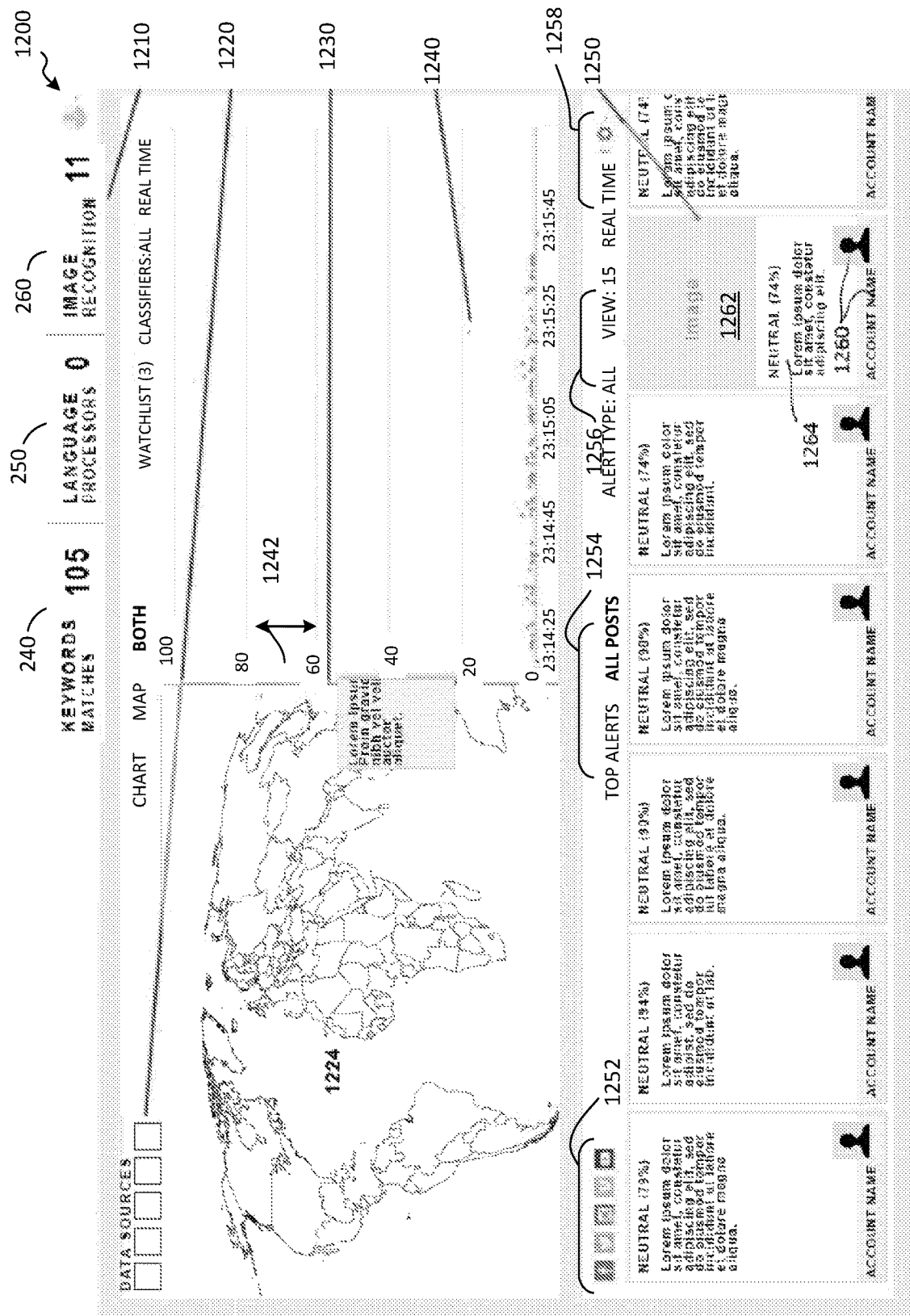
FIG. 12 is a screenshot diagram depicting a dashboard interface, according to one embodiment.

FIG. 12 is a screenshot diagram of a dashboard interface 1200 according to one embodiment. Header 1210 provides a mechanism for pushing tailored alerts to users, guiding them to review such alerts and provide input. In this example, header 1210 indicates the number of matches based on different types of analysis: keyword matching, language processing, and image recognition. Header 1210 may optionally include a keyword panel 240, a language panel 250, and an image panel 260, as in FIG. 2.

Figure 17:
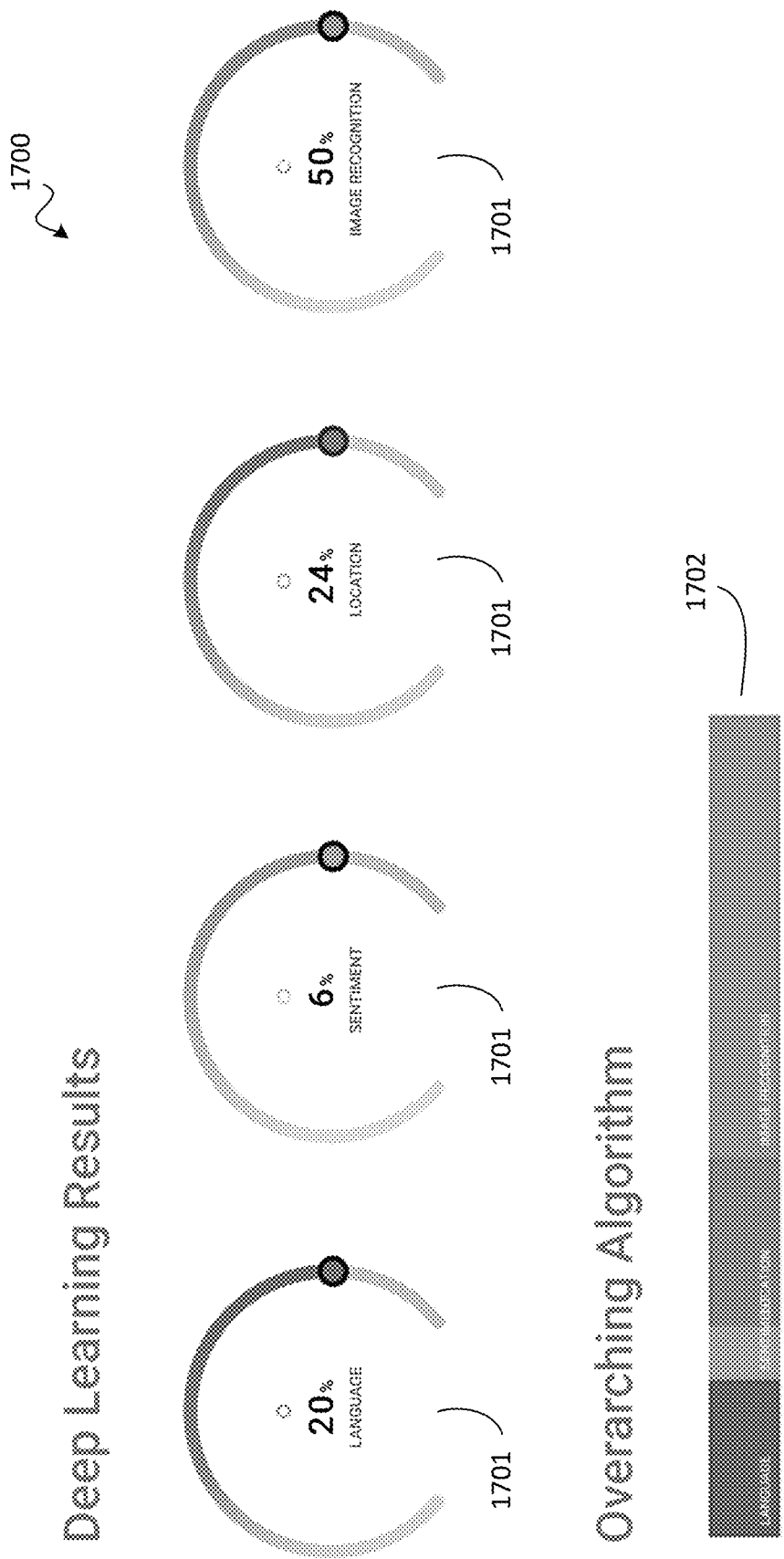
FIG. 17 is a screenshot diagram depicting a user interface to allow a user to create custom alerts in a graphical way by manipulating sliding bars, according to one embodiment.

Any suitable mechanism can be used for specifying and generating alerts, including custom alerts. Referring now to FIG. 17, there is shown an example of a user interface 1700 that can be included, for example on an admin panel, to allow a user to create custom alerts in a graphical way by manipulating sliding bars 1701. Based on such input, the system dynamically adjusts weights of various outputs from the deep learning models.

For example, the user could use the interface depicted in FIG. 17 to increase the weight of image recognition results (such as from 50% to 80% of an overall 100% weight) and simultaneously decrease the weight of other elements such as language classification and sentiment. As another example, a particular project may have no image recognition or language classification needs, so that sentiment is the most important element; the user can thus adjust the weights so that alerts are sent in accordance with these preferences. Bar graph 1702 can be automatically and dynamically updated to show the relative weights of various components within the overarching algorithm in response to user manipulations of sliding bars 1701.

In such a manner, adjustments of weights for the overarching algorithm can be made in an interactive, visual, and intuitive manner.

When users provide input in response to such alerts, the user input is added to training material that is then used to train the system to improve its intelligence and effectiveness in providing improved results. In at least one embodiment, the user input is vetted by subject matter experts before being submitted for training. In this manner, in the course of taking basic actions, users are providing useful feedback for training the system.

Icons 1220 allow users to sort communications 112 on a map 1224 by data source, such as social network, proprietary third-party data, and/or other sources.

In at least one embodiment, communications 112 having location (geo) information are displayed on an interactive map, and can be color-coded based on user preferences. For example, communications 112 can be displayed in red if they are deemed to be negative, or green if they are positive. An example communication 112 is shown at 1230. Such a display provides the ability to visualize and gain insight as to patterns of relevant social media activity.

Scatterplot graph 1240 displays alerts, with the vertical axis 1242 representing priority (highest priority posts appear at the top). Any suitable mechanism can be used for determining priority, including for example user goals or preferences.

In at least one embodiment, prioritized alerts can also be presented in a horizontal strip 1250, allowing users to easily scroll through activity, and review and take action.

FIG. 12 depicts additional details that can be shown in horizontal strip 1250, including for example:

- Icons 1252 to choose which data sets are to be displayed, including social media, other online data feeds, and/or data supplied by clients;
- Selection 1254 of whether to include only the top communications 112 or all communications 112;
- Selection 1256 of types of alerts/classifications to who, such as, for example, all negative social media posts about a specific product;
- An option 1258 to choose either real-time data fees or a display of historical data based on date/time range;
- Display 1260 of username and profile image, for content from social media;
- Display 1262 of images associated with social media posts, if available;
- Display 1264 of user-created categories/classifications for each time.

FIG. 13 is a screenshot diagram depicting a screen 1300 that is presented in response to a user clicking, tapping on, or otherwise selecting the keyword panel 240 in header 1210, according to one embodiment. As in FIG. 3, the list depicted in FIG. 13 includes, for each communication 112, the textual content 340 of the communication 112, the automated evaluation 113 for the communication 112, including a classification type 320 and a confidence level 330, and keyword actions 310 that can be taken by the user.

As in FIG. 3, the user can click on a blue checkbox 350 to indicate that the classification type 320 is correct, a red up arrow 360 for escalation, a green arrow 370 to indicate a false positive, and a black trash bin 380 to delete the communication from the database. In this manner, the system guides users through an intuitive user interface to allow the user to indicate specific and strategic actions that train the machine learning algorithm. Over time, the user experience improves, as the software becomes more accurate in its classifications.

Figure 14:
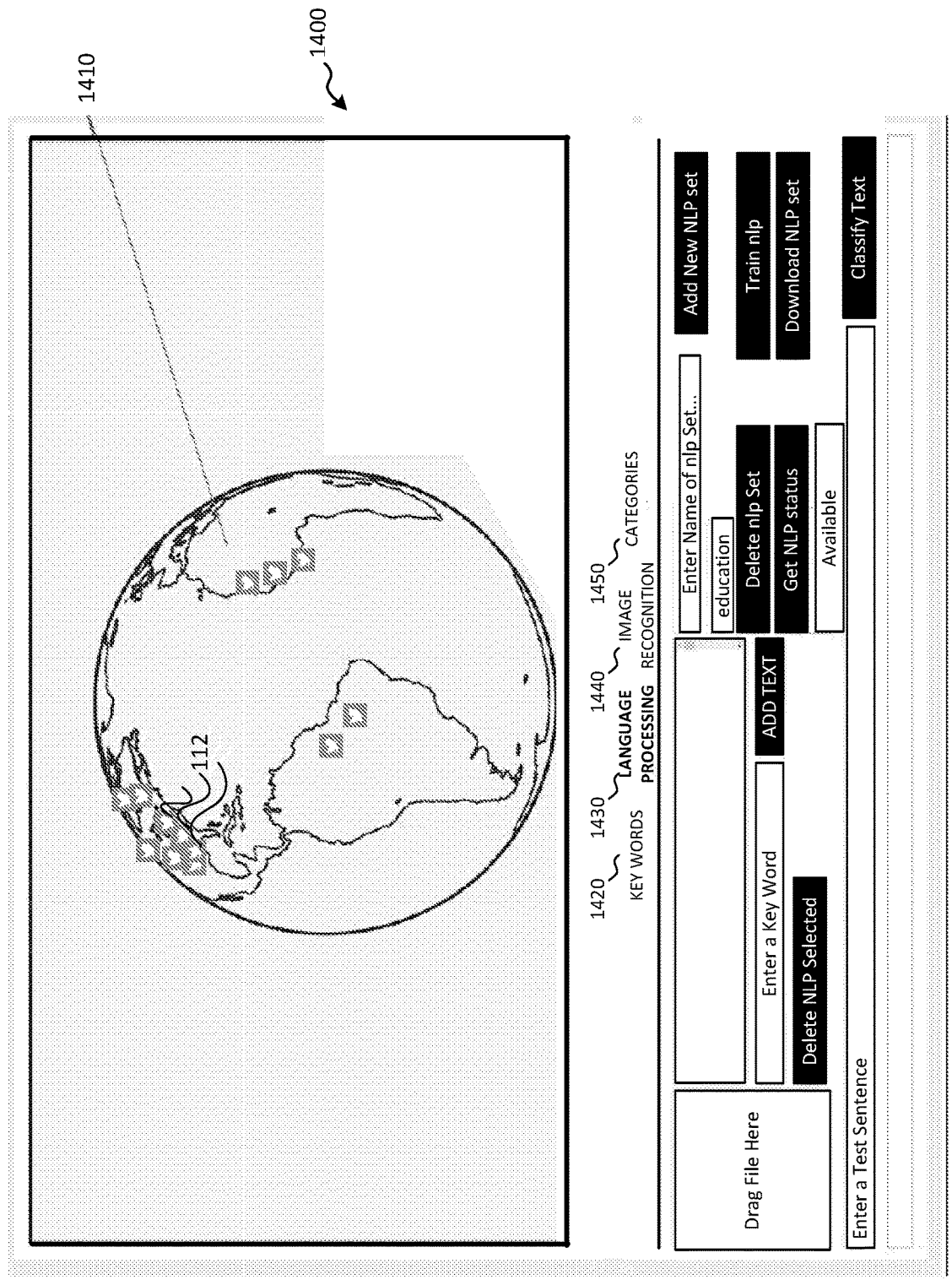
FIG. 14 is a screenshot diagram depicting communications on a display of a 3D globe, according to one embodiment.

FIG. 14 is a screenshot diagram depicting another view 1400, wherein communications 112 are depicted on a display of a 3D globe 1410, according to one embodiment. Processed data with location information is displayed on globe 1410, using third-party APIs. Location indicators can be color-coded, and/or can use icons or symbols to indicate classification type, data source, and/or the like; such indications can optionally be user-selected.

A keywords link 1420 may be used to enter words to train the system, for example, to prioritize or de-prioritize communications 112 containing those words.

Using Language Processing link 1430, users can enter strings of text, such as tweets, to train the system as to the meaning of particular words in certain contexts.

Image recognition link 1440 allows users to train image recognition models by uploading training material in the form of images.

Categories link 1450 allows users to create training sets and then categorize their materials. This includes, for example, creating category names and/or specifying colors for location pins and priority levels.

Figure 15:
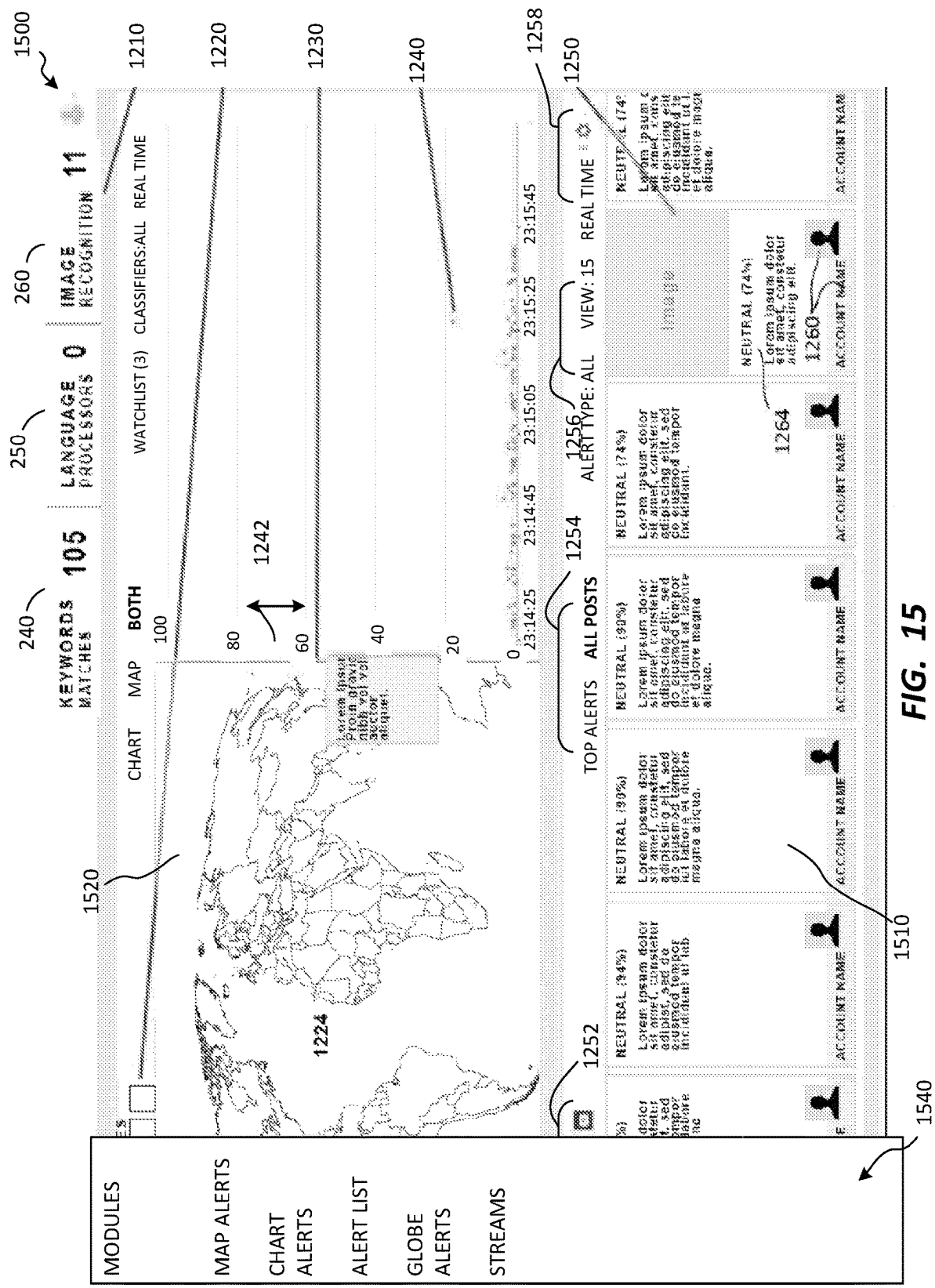
FIG. 15 is a screenshot diagram depicting another view, including a display of top alerts, a geographic view, a scatterplot, and a collapsible sidebar, according to one embodiment.

FIG. 15 is a screenshot diagram depicting another view 1500, including a display of top alerts 1510, a geographic view 1520, a scatterplot 1530, and a collapsible sidebar 1540 that allows the user to turn on or off individual modules and displays, according to one embodiment. Some modules can be core functions of the software, while others can be client-specific.

Figure 16:
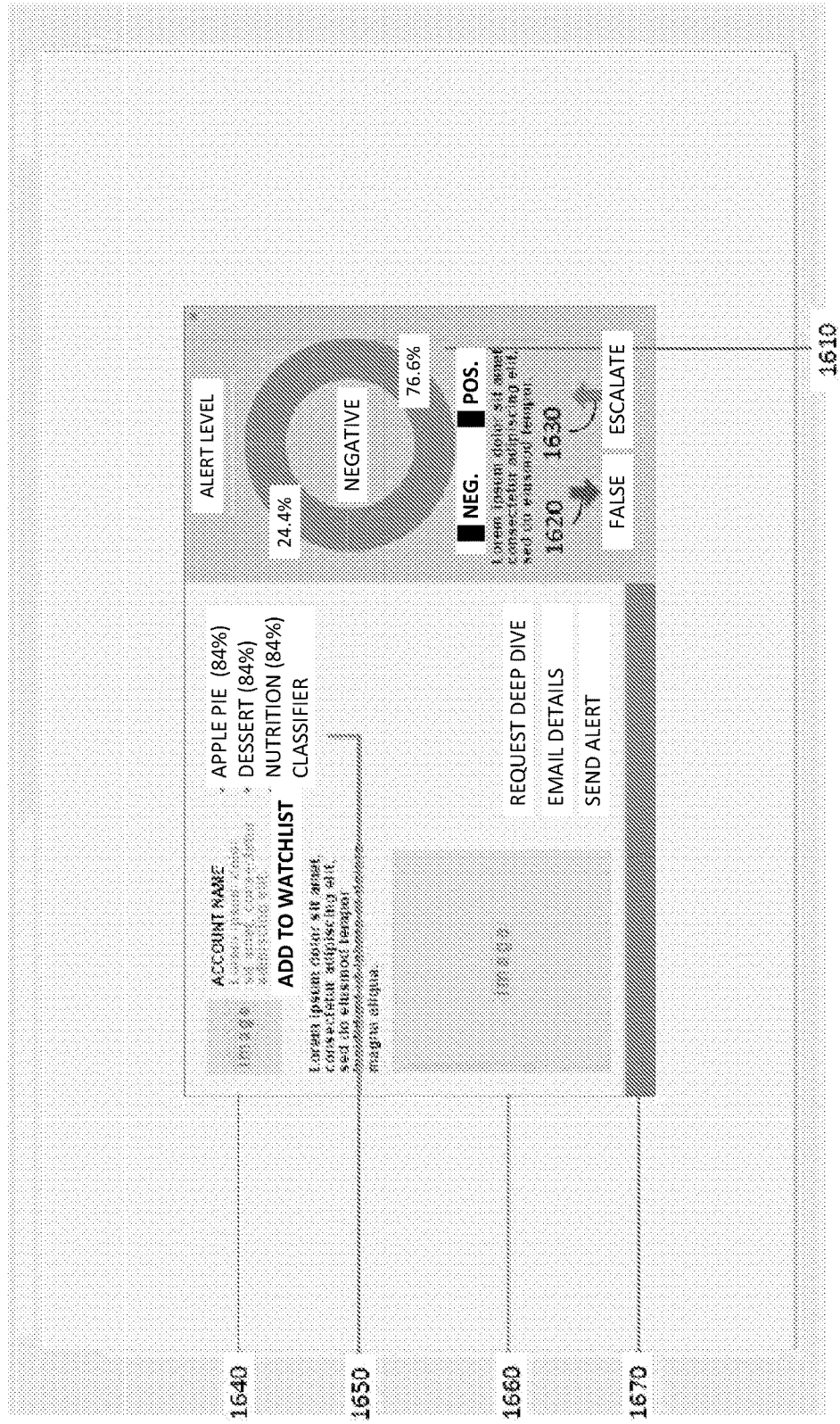
FIG. 16 is a screenshot diagram depicting a view including a pie chart showing results from natural language processing, according to one embodiment.

FIG. 16 is a screenshot diagram depicting a view 1600 including a pie chart 1610 showing results from natural language processing, according to one embodiment. Content can be classified according to any classifications established by the user, such as positive, negative, and/or pertaining to a certain ad campaign or other initiative. If an item is not classified, or is incorrectly classified, a user can click on a particular slice of the pie chart 1610 to indicate a correct classification for the item. Such user input can then be used as training data for the underlying machine learning engine. A false button 1620 and an escalate button 1630 can also be provided, as in this example, to allow users to label false positives and thereby train the system. Social media user profile information 1640 for the communication 112, image recognition and natural language processing classifications 1650 for the communication 112, an image 1660 from the communication, and an origination 1670 of the communication 112 may also be displayed.

The above description sets forth exemplary embodiments. In at least one embodiment, the various deep learning social media intelligence models used in connection with the described system are based on third-party social media feeds. The described system applies such models externally, allowing users to create models based an aggregate of multiple social media feeds.

Many variations on the foregoing systems and methods may be made through the application of principles and techniques known in the art. In particular, the principles and techniques of any of the following may be applied to the present disclosure, either singly or in combination:

1. Firat, A., et al., *Systems and methods for calculating category proportions*, 2016, Google Patents.
2. Bingham, C., et al., *Analysing topics in social networks*, 2014, Google Patents.
3. Firat, A., et al., *Analyzing interests based on social media data*, 2014, Google Patents.
4. Firat, A., et al., *Method and apparatus for improved searching of digital content*, 2015, Google Patents.
5. Bennett, M., et al., *Method, system and apparatus for identifying and parsing social media information for providing business intelligence*, 2015, Google Patents.
6. Louis, A., *Natural Language Processing for Social Media*, 2017, MIT Press.
7. Nakov, P., et al., *Developing a successful SemEval task in sentiment analysis of Twitter and other social media texts*. Language Resources and Evaluation, 2016. 50(1): p. 35.
8. Dai, X., M. Bikdash, and B. Meyer. *From social media to public health surveillance: Word embedding based clustering method for twitter classification*. in SoutheastCon, 2017. 2017. IEEE.
9. Tien Nguyen, D., et al., *Applications of Online Deep Learning for Crisis Response Using Social Media Information*. arXiv preprint arXiv:1610.01030, 2016.
10. Gong, Y., et al. *Improving Image-Sentence Embeddings Using Large Weakly Annotated Photo Collections*. in ECCV (4). 2014.
11. Kiros, R., R. Salakhutdinov, and R. Zemel. *Multimodal neural language models*. in Proceedings of the 31st International Conference on Machine Learning (ICML-14). 2014.

12. Lynch, C., K. Aryafar, and J. Attenberg, *Images don't lie: Transferring deep visual semantic features to large-scale multimodal learning to rank.* arXiv preprint arXiv:1511.06746, 2015.
13. Eskesen, S., *Improving product categorization by combining image and title.* 2017.
14. Zahavy, T., et al., *Is a picture worth a thousand words? A Deep Multi-Modal Fusion Architecture for Product Classification in e-commerce.* arXiv preprint arXiv:1611.09534, 2016.
15. Zhou, C., et al., *A C-LSTM neural network for text classification.* arXiv preprint arXiv:1511.08630, 2015.
16. Yogatama, D., et al., *Generative and discriminative text classification with recurrent neural networks.* arXiv preprint arXiv:1703.01898, 2017.
17. Goldberg, Y. and O. Levy, *word2vec Explained: deriving Mikolov et al.'s negative-sampling word-embedding method.* arXiv preprint arXiv:1402.3722, 2014.
18. Mikolov, T., et al., *Efficient estimation of word representations in vector space.* arXiv preprint arXiv:1301.3781, 2013.
19. Mikolov, T., et al. *Distributed representations of words and phrases and their compositionality.* in *Advances in neural information processing systems.* 2013.
20. Pennington, J., R. Socher, and C. D. Manning. *Glove: Global vectors for word representation.* in *EMNLP.* 2014.
21. Frome, A., et al. *Devise: A deep visual-semantic embedding model.* in *Advances in neural information processing systems.* 2013.
22. Kannan, A., et al., *Smart reply: Automated response suggestion for email.* arXiv preprint arXiv:1606.04870, 2016.
23. Iandola, F., et al., *Densenet: Implementing efficient convnet descriptor pyramids.* arXiv preprint arXiv:1404.1869, 2014.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for evaluating content on one or more social media networks, the method comprising:
   at a data store, storing a deep learning model having a plurality of hidden states corresponding to different modalities;
   at a processor, receiving a plurality of communications, each of which has been or is to be communicated on a social network, wherein at least a subset of the communications comprises content associated with multiple modalities;
   at the processor, applying the deep learning model to the communications to obtain automated evaluations of the communications, wherein each automated evaluation comprises classification of a combination of at least two of the hidden states;
   at an output device, presenting results of the automated evaluations to a user, the results comprising a list of communications requiring action by the user;
   at an input device, receiving user input comprising at least one user evaluation of at least one of the communications and specifying at least one action to be taken with respect to the at least one communication;
   at the processor, performing the specified at least one action on the at least one communication;
   at the processor, applying the at least one user evaluation of the at least one communication to train the deep learning model;
   at the processor, separately performing a training step, for each modality of the different modalities of the deep learning model, to generate a plurality of hidden states for each modality of the different modalities of the deep learning model;
   at the processor, concatenating the plurality of hidden states for each modality of the different modalities of the deep learning model to form an output state of the deep learning model; and
   at the processor, training the deep learning model in its entirety using the output state;
   wherein the user input specifying the at least one action specifies at least one action selected from a plurality of available actions that can be performed with respect to the at least one communication; and
   wherein at least one of the available actions comprises modifying the at least one communication.

2. The method of claim 1, further comprising, at the output device, presenting the automated evaluations to a user;
   wherein the at least one user evaluation at least partially confirms or at least partially rejects the automated evaluations.

3. The method of claim 2, wherein presenting the automated evaluations to the user comprises at least one selected from the group consisting of:
   presenting the automated evaluations in conjunction with textual content from at least one of the communications;
   presenting the automated evaluations in conjunction with image content from at least one of the communications; and
   presenting the automated evaluations in conjunction with at least one geographic location from which at least one of the communications originated.

4. The method of claim 1, further comprising iteratively repeating the steps of:
   receiving the communications;
   applying the deep learning model to the communications to obtain the automated evaluations;
   presenting the results of the automated evaluations;
   receiving the user input comprising the at least one user evaluation; and
   applying the at least one user evaluation to train the deep learning model.

5. The method of claim 1, further comprising, prior to storing the deep learning model:
   finding one or more embeddings for each word of a corpus using unsupervised learning to populate a word vector space that represents word-to-word co-occurrence statistics within the corpus; and
   finding classifications of each of a plurality of sentences using supervised learning to provide the deep learning model.

6. The method of claim 1, wherein applying the deep learning model to the communications comprises utilizing at least one selected from the group consisting of:
- a multi-task learning deep learning scheme for image, text, and multimodal deep learning tasks; and
- a transfer learning training protocol comprising a combination of bidirectional long short-term memory (LSTMs), fully-connected layers, and convolutional layers.

7. The method of claim 1, further comprising, prior to storing the deep learning model, building the deep learning model through use of an automated architecture generator and hyper-parameter tuning optimization algorithm.

8. The method of claim 1, wherein applying the deep learning model to the communications comprises utilizing a deep learning feature-level multimodal algorithm that incorporates all available information pertinent to the communication.

9. The method of claim 1, further comprising, at the output device, outputting a user alert based on results of application of the deep learning model to the communications.

10. The method of claim 9, further comprising, prior to outputting the user alert, receiving, at the input device, input specifying weights for various parameters in triggering alerts;
and wherein outputting the user alert based on results of application of the deep learning model to the communications comprises outputting the user alert responsive to the alert being triggered according to the specified weights.

11. The method of claim 10, wherein the input specifying weights for various parameters in triggering alerts is received via a visual user interface.

12. The method of claim 1, wherein at least one of the available actions comprises censoring the at least one communication.

13. The method of claim 1, wherein the hidden states are enforced to be the same size as one another.

14. A non-transitory computer-readable medium for evaluating content on one or more social media networks, comprising instructions stored thereon, that when executed by a processor, perform the steps of:
- causing a data store to store a deep learning model having a plurality of hidden states corresponding to different modalities;
- receiving a plurality of communications, each of which has been or is to be communicated on a social network, wherein at least a subset of the communications comprises content associated with multiple modalities;
- applying the deep learning model to the communications to obtain automated evaluations of the communications, wherein each automated evaluation comprises classification of a combination of at least two of the hidden states;
- causing an output device to present results of the automated evaluations to a user, the results comprising a list of communications requiring action by the user;
- causing an input device to receive user input comprising at least one user evaluation of at least one of the communications and specifying at least one action to be taken with respect to the at least one communication;
- performing the specified at least one action on the at least one communication;
- applying the at least one user evaluation of the at least one communication to train the deep learning model;
- separately performing a training step, for each modality of the different modalities of the deep learning model, to generate a plurality of hidden states for each modality of the different modalities of the deep learning model;
- concatenating the plurality of hidden states for each modality of the different modalities of the deep learning model to form an output state of the deep learning model; and
- training the deep learning model in its entirety using the output state;
- wherein the user input specifying the at least one action specifies at least one action selected from a plurality of available actions that can be performed with respect to the at least one communication;
- and wherein at least one of the available actions comprises modifying the at least one communication.

15. The non-transitory computer-readable medium of claim 14, further comprising instructions stored thereon, that when executed by a processor, cause an output device to present the automated evaluations to a user;
wherein the at least one user evaluation at least partially confirms or at least partially rejects the automated evaluations.

16. The non-transitory computer-readable medium of claim 14, further comprising instructions stored thereon, that when executed by a processor, iteratively repeat the steps of:
- receiving the communications;
- applying the deep learning model to the communications to obtain the automated evaluations;
- causing the output device to present the results of the automated evaluations;
- causing the input device to receive the user input comprising the at least one user evaluation; and
- applying the at least one user evaluation to train the deep learning model.

17. The non-transitory computer-readable medium of claim 14, further comprising instructions stored thereon, that when executed by a processor, prior to storing the deep learning model, perform the steps of:
- finding one or more embeddings for each word of a corpus using unsupervised learning to populate a word vector space that represents word-to-word co-occurrence statistics within the corpus; and
- finding classifications of each of a plurality of sentences using supervised learning to provide the deep learning model.

18. The non-transitory computer-readable medium of claim 14, wherein applying the deep learning model to the communications comprises utilizing at least one selected from the group consisting of:
- a multi-task learning deep learning scheme for image, text, and multimodal deep learning tasks; and
- a transfer learning training protocol comprising a combination of bidirectional long short-term memory (LSTMs), fully-connected layers, and convolutional layers.

19. The non-transitory computer-readable medium of claim 14, further comprising instructions stored thereon, that when executed by a processor, cause the output device to output a user alert based on results of application of the deep learning model to the communication.

20. The non-transitory computer-readable medium of claim 19, further comprising, prior to causing the output device to output the user alert, causing the input device to receive input specifying weights for various parameters in triggering alerts;

and wherein causing the output device to output the user
alert based on results of application of the deep learning
model to the communications comprises causing the
output device to output the user alert responsive to the
alert being triggered according to the specified weights;
wherein the input specifying weights for various
parameters in triggering alerts is received via a visual
user interface.

21. The non-transitory computer-readable medium of claim 14, wherein at least one of the available actions comprises censoring the at least one communication.

22. The non-transitory computer-readable medium of claim 14, wherein the hidden states are enforced to be the same size as one another.

23. A system for evaluating content on one or more social media networks, the system comprising:
  a data store configured to store a deep learning model having a plurality of hidden states corresponding to different modalities;
  a processor, communicatively coupled to the data store, configured to:
    receive a plurality of communications, each of which has been or is to be communicated on a social network, wherein at least a subset of the communications comprises content associated with multiple modalities;
    apply the deep learning model to the communications to obtain automated evaluations of the communications, wherein each automated evaluation comprises classification of a combination of at least two of the hidden states;
    separately perform a training step, for each modality of the different modalities of the deep learning model, to generate a plurality of hidden states for each modality of the different modalities of the deep learning model;
    concatenate the plurality of hidden states for each modality of the different modalities of the deep learning model to form an output state of the deep learning model; and
    train the deep learning model in its entirety using the output state;
  an output device, communicatively coupled to the processor, configured to present results of the automated evaluations to a user, the results comprising a list of communications requiring action by the user; and
  an input device, communicatively coupled to the processor, configured to receive user input comprising at least one user evaluation of at least one of the communications and specifying at least one action to be taken with respect to the at least one communication;
  wherein the processor is further configured to:
    perform the specified at least one action on the at least one communication; and
    apply the user evaluation of the communication to train the deep learning model;
  and wherein the user input specifying the at least one action specifies at least one action selected from a plurality of available actions that can be performed with respect to the at least one communication;
  and wherein at least one of the available actions comprises modifying the at least one communication.

24. The system of claim 23, wherein the output device is further configured to present the automated evaluation to a user;
  and wherein the at least one user evaluation at least partially confirms or at least partially rejects the automated evaluation.

25. The system of claim 23, wherein the processor is further configured to iteratively repeat the steps of:
  receiving the communications;
  applying the deep learning model to the communications to obtain the automated evaluation; and
  applying the user evaluation to train the deep learning model;
  and wherein the output device is further configured to iteratively repeat the step of presenting results of the automated evaluations to a user;
  and wherein the input device is further configured to iteratively repeat the step of receiving the user input comprising the user evaluation.

26. The system of claim 23, wherein the processor is further configured to, prior to storing the deep learning model:
  find one or more embeddings for each word of a corpus using unsupervised learning to populate a word vector space that represents word-to-word co-occurrence statistics within the corpus; and
  find classifications of each of a plurality of sentences using supervised learning to provide the deep learning model.

27. The system of claim 23, wherein applying the deep learning model to the communications comprises utilizing at least one selected from the group consisting of:
  a multi-task learning deep learning scheme for image, text, and multimodal deep learning tasks; and
  a transfer learning training protocol comprising a combination of bidirectional long short-term memory (LSTMs), fully-connected layers, and convolutional layers.

28. The system of claim 23, wherein the output device is further configured to output a user alert based on results of application of the deep learning model to the communication.

29. The system of claim 28, wherein the input device is further configured to receive, prior to the output device outputting the user alert, input specifying weights for various parameters in triggering alerts;
  and wherein outputting the user alert based on results of application of the deep learning model to the communications comprises outputting the user alert responsive to the alert being triggered according to the specified weights;
  and wherein the input specifying weights for various parameters in triggering alerts is received via a visual user interface.

30. The system of claim 23, wherein at least one of the available actions comprises censoring the at least one communication.

31. The system of claim 23, wherein the hidden states are enforced to be the same size as one another.

* * * * *